INVENTOR.
LELAND G. REED
BY Hazard & Miller
ATTORNEYS

INVENTOR.
LELAND G. REED
BY Hazard & Miller
ATTORNEYS

INVENTOR.
LELAND G. REED
BY Hazard & Miller
ATTORNEYS

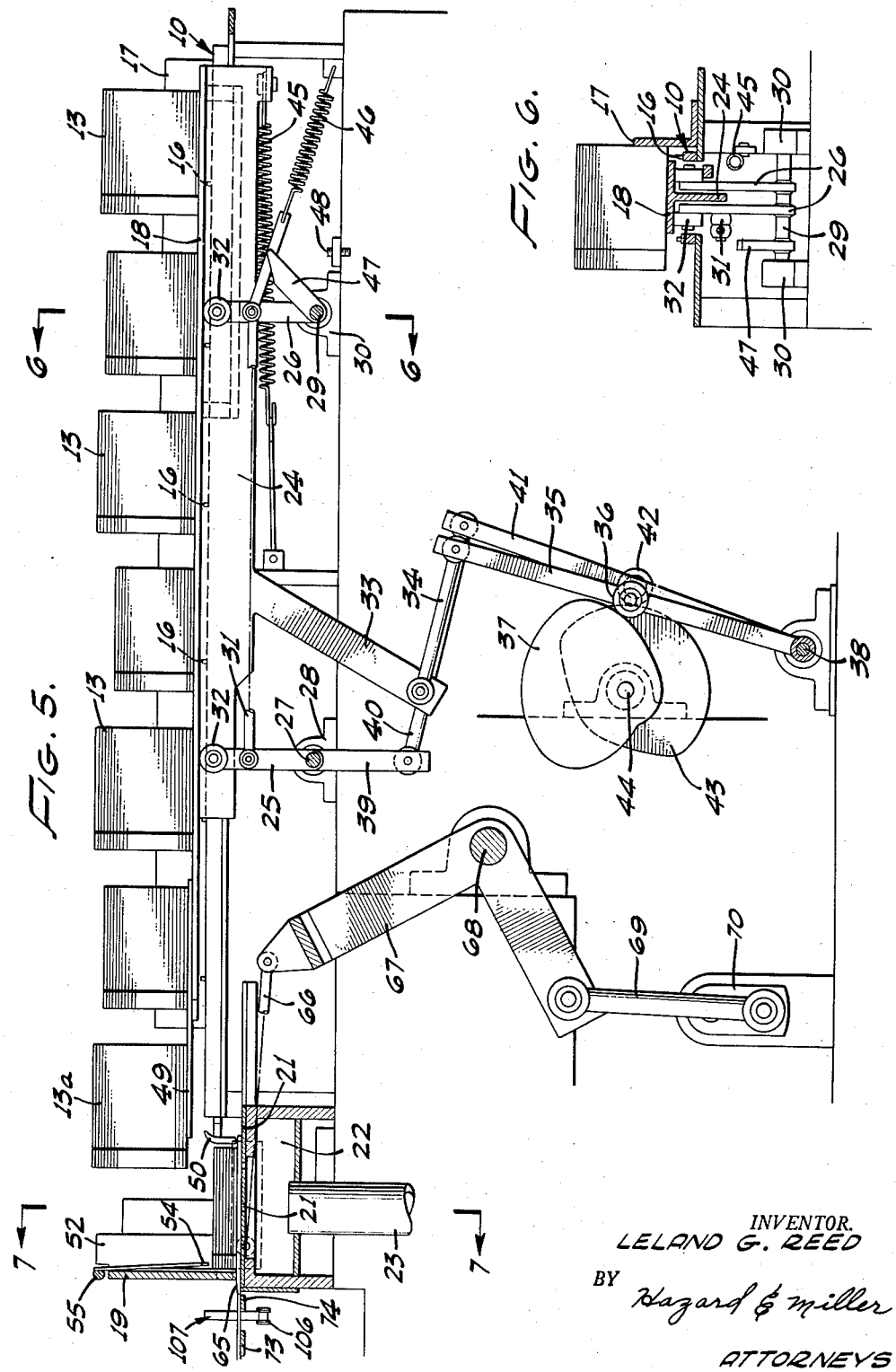

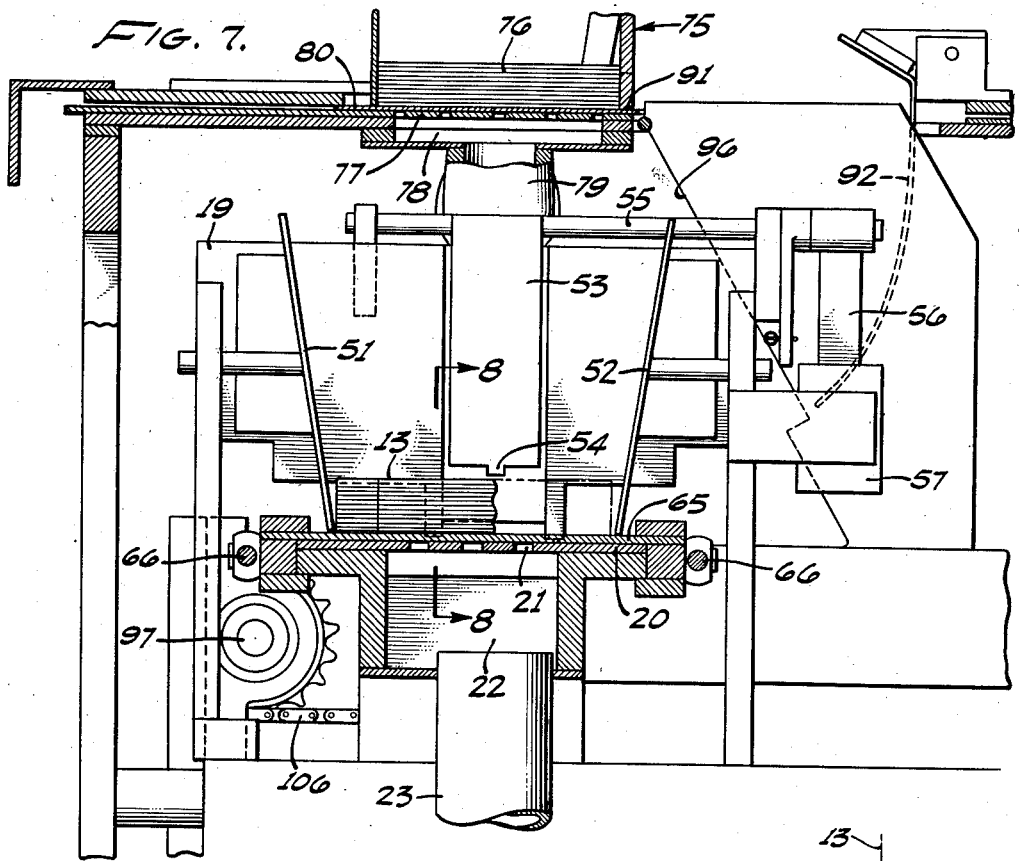
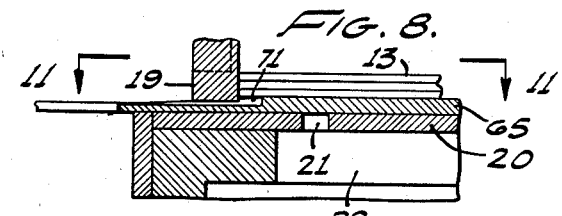
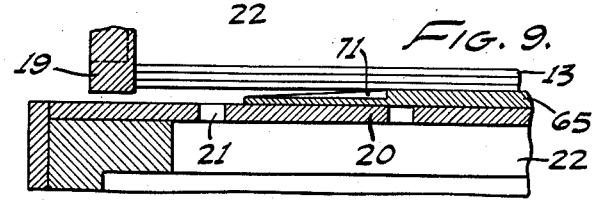
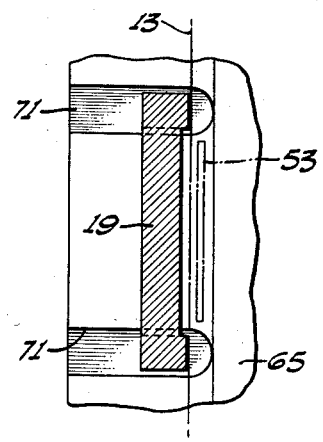
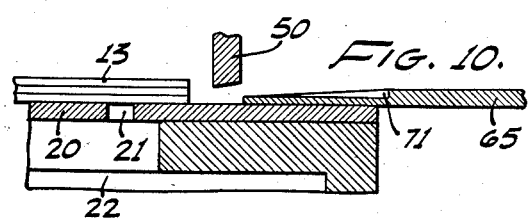
INVENTOR.
LELAND G. REED
BY Hazard & Miller
ATTORNEYS

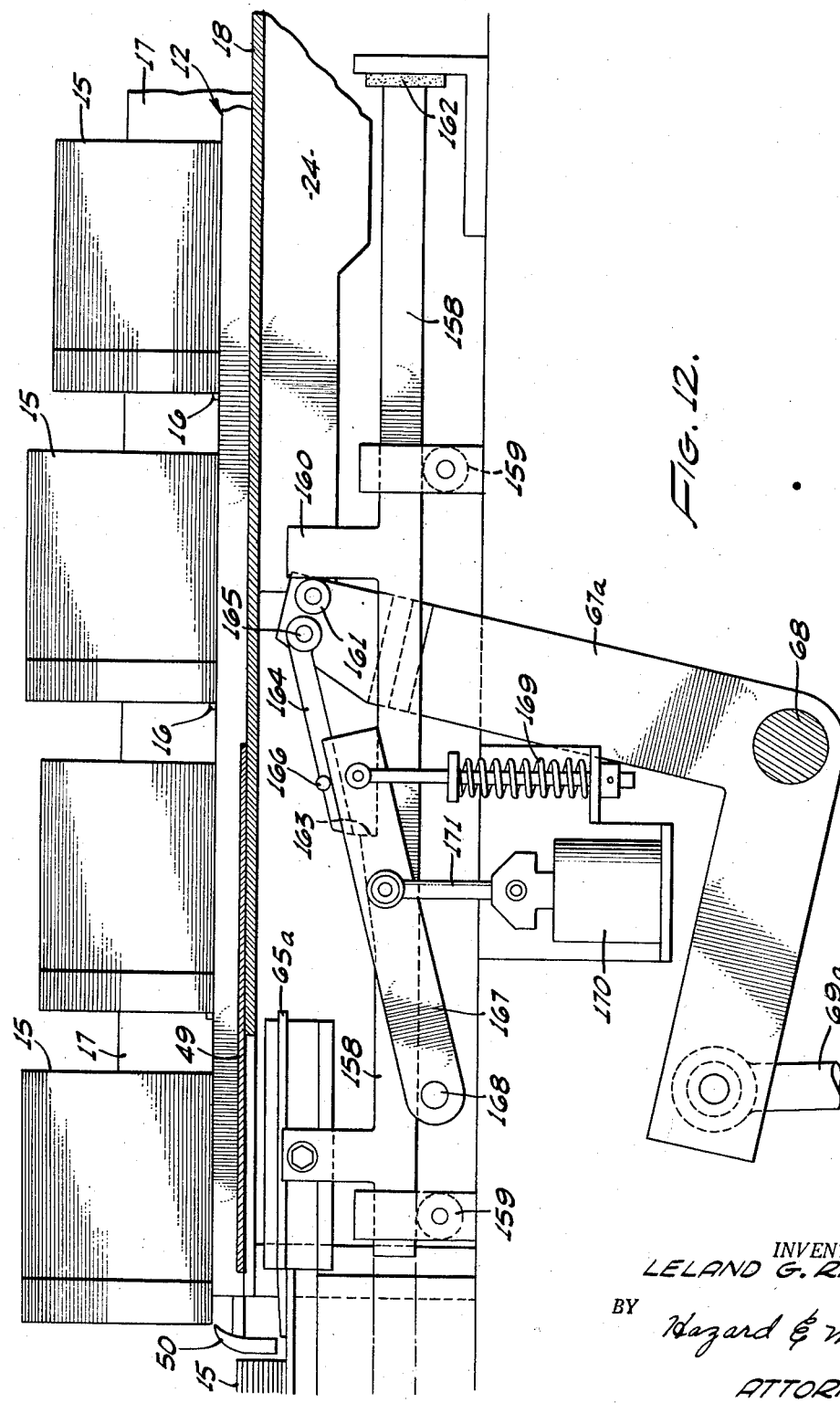

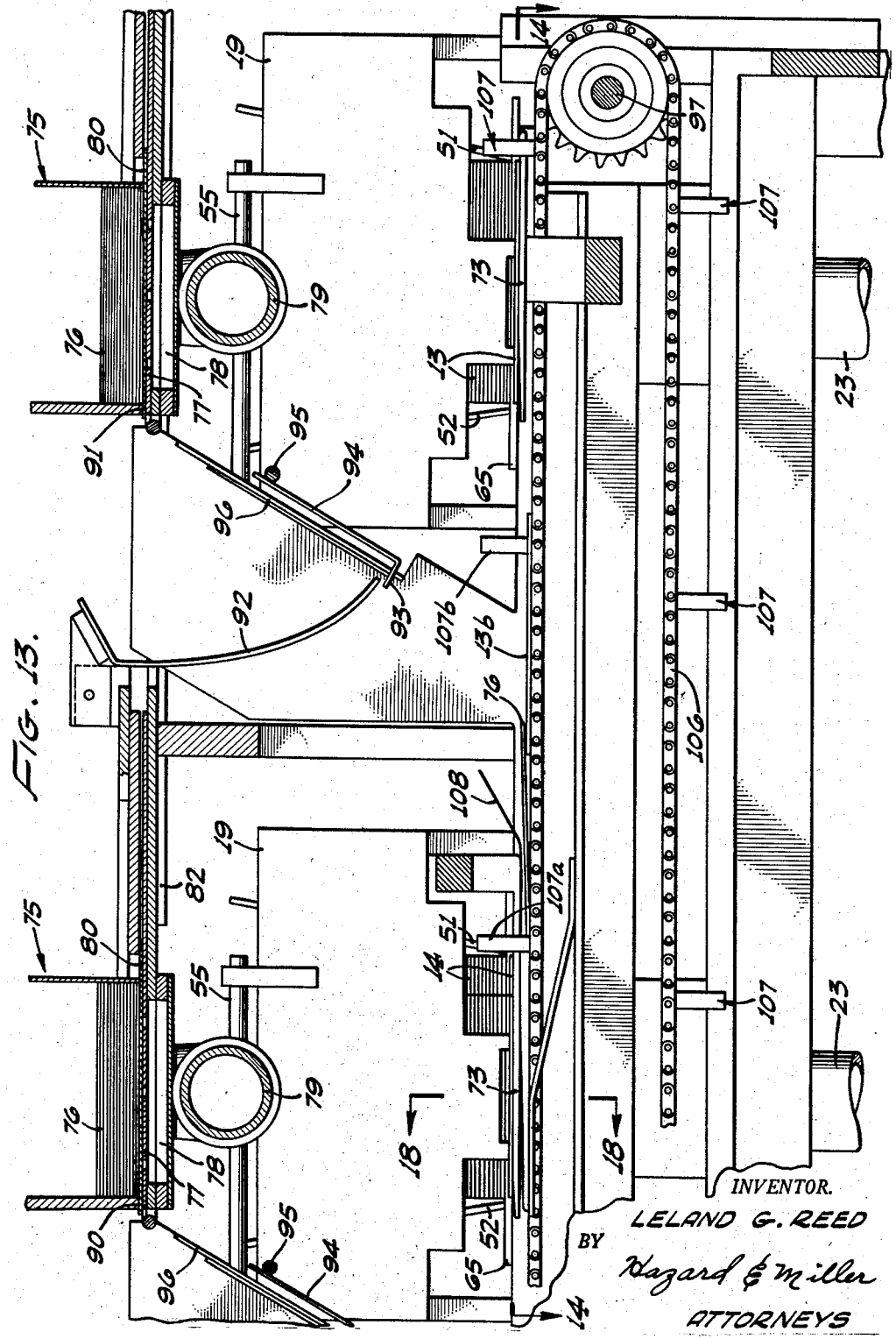

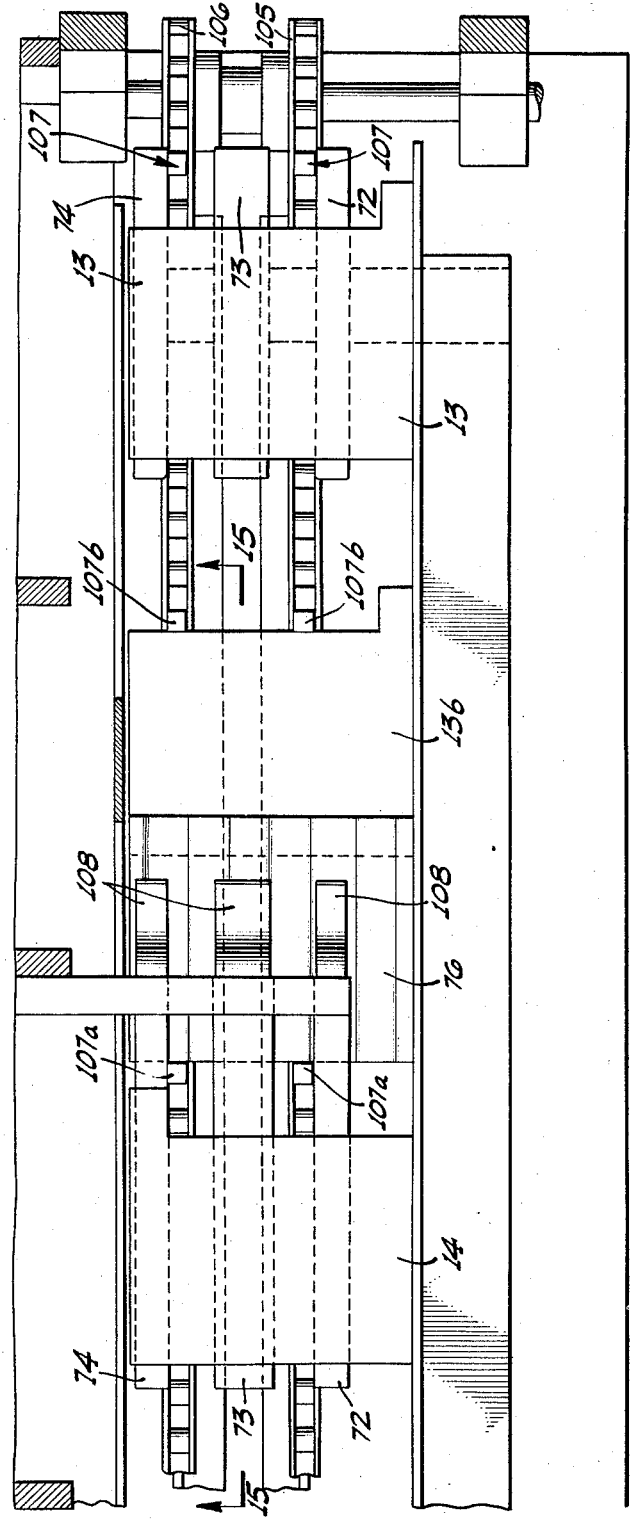
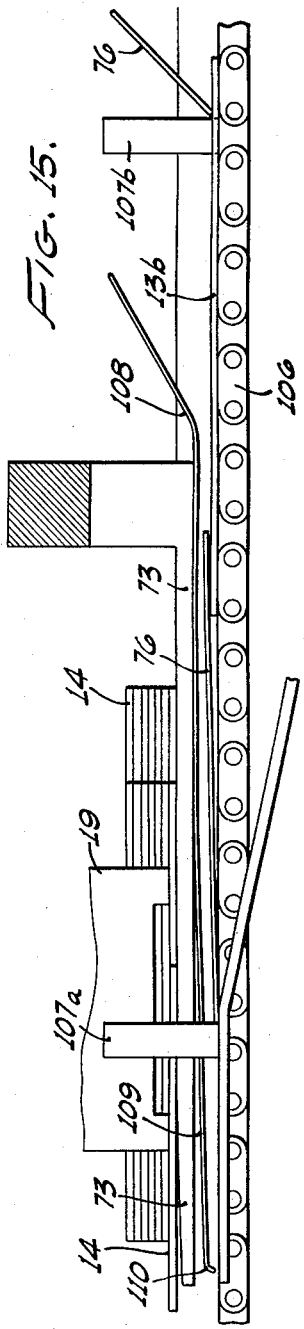
FIG. 14.
FIG. 15.
INVENTOR.
LELAND G. REED
BY Hazard & Miller
ATTORNEYS

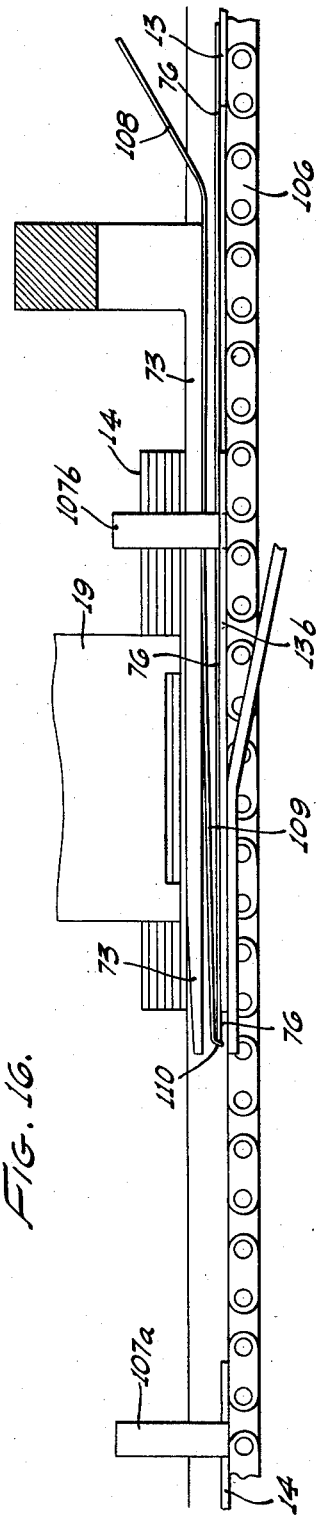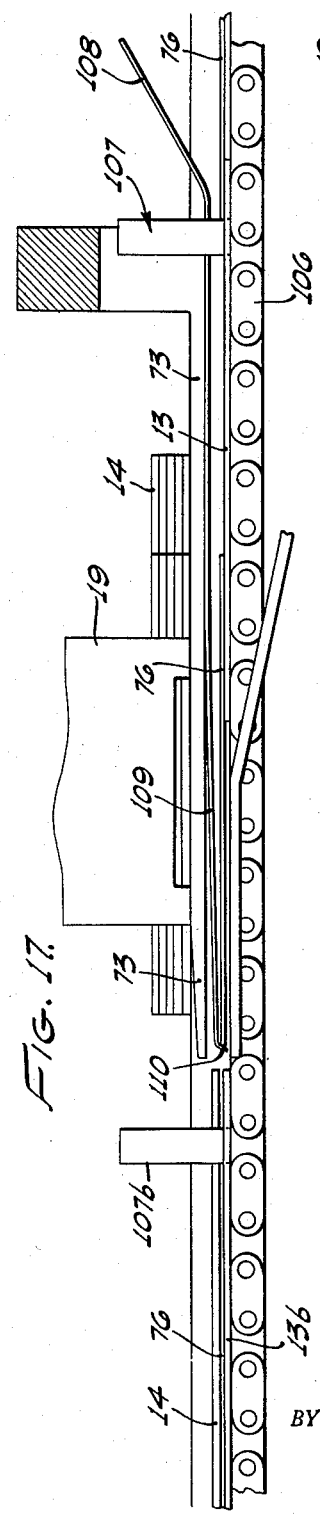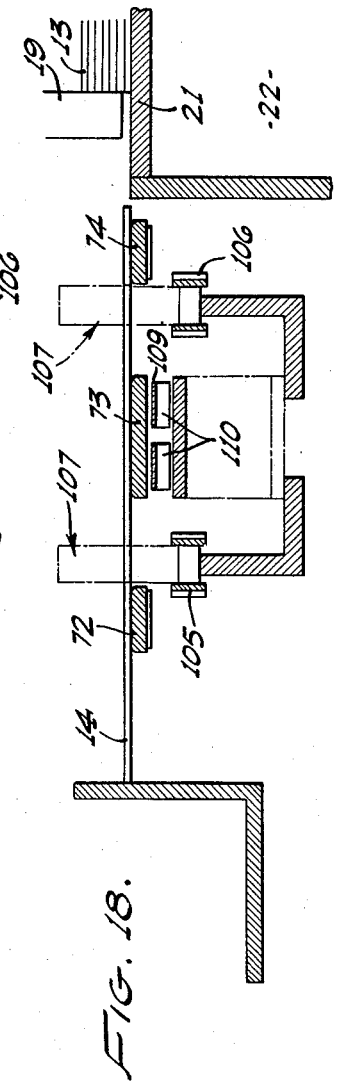

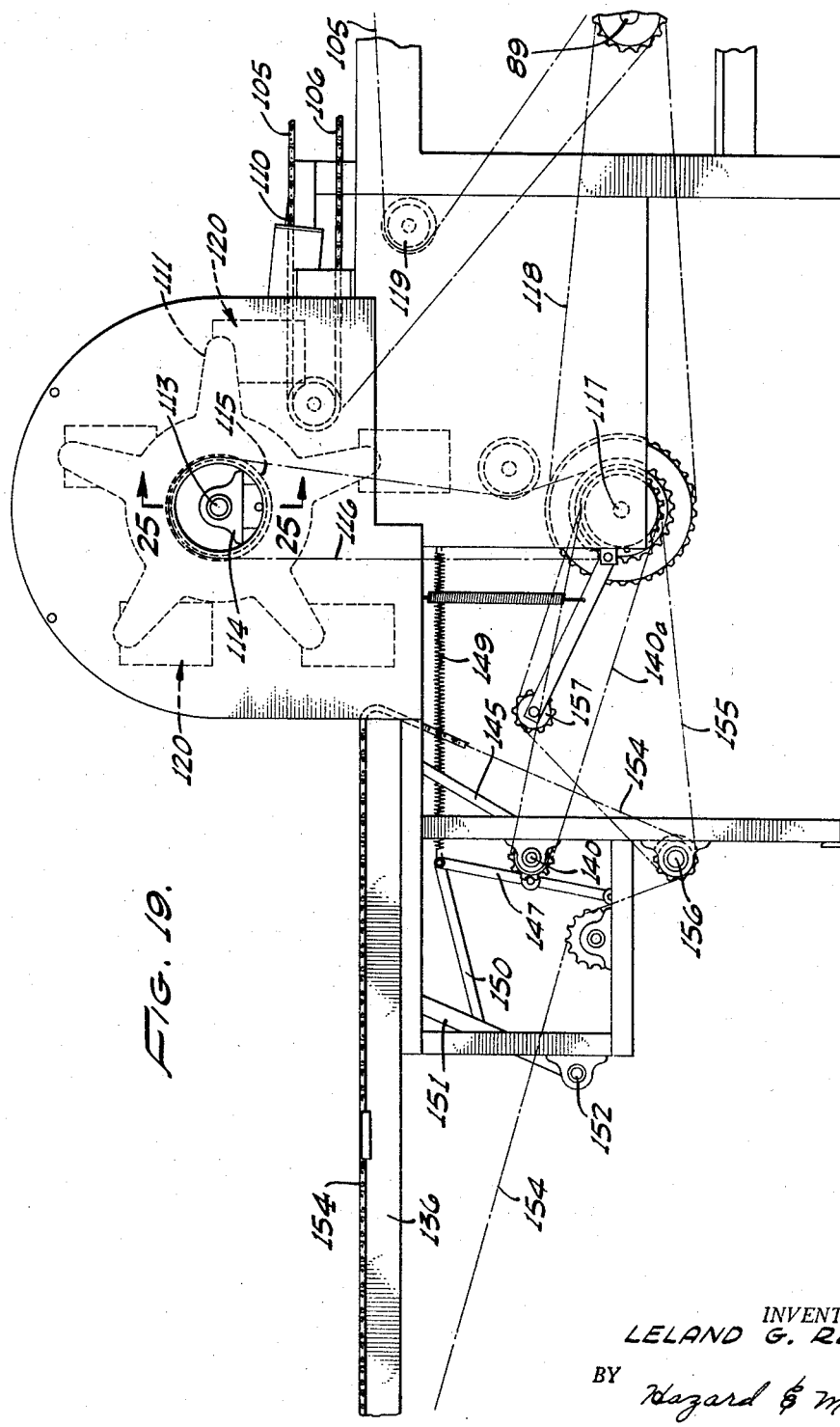

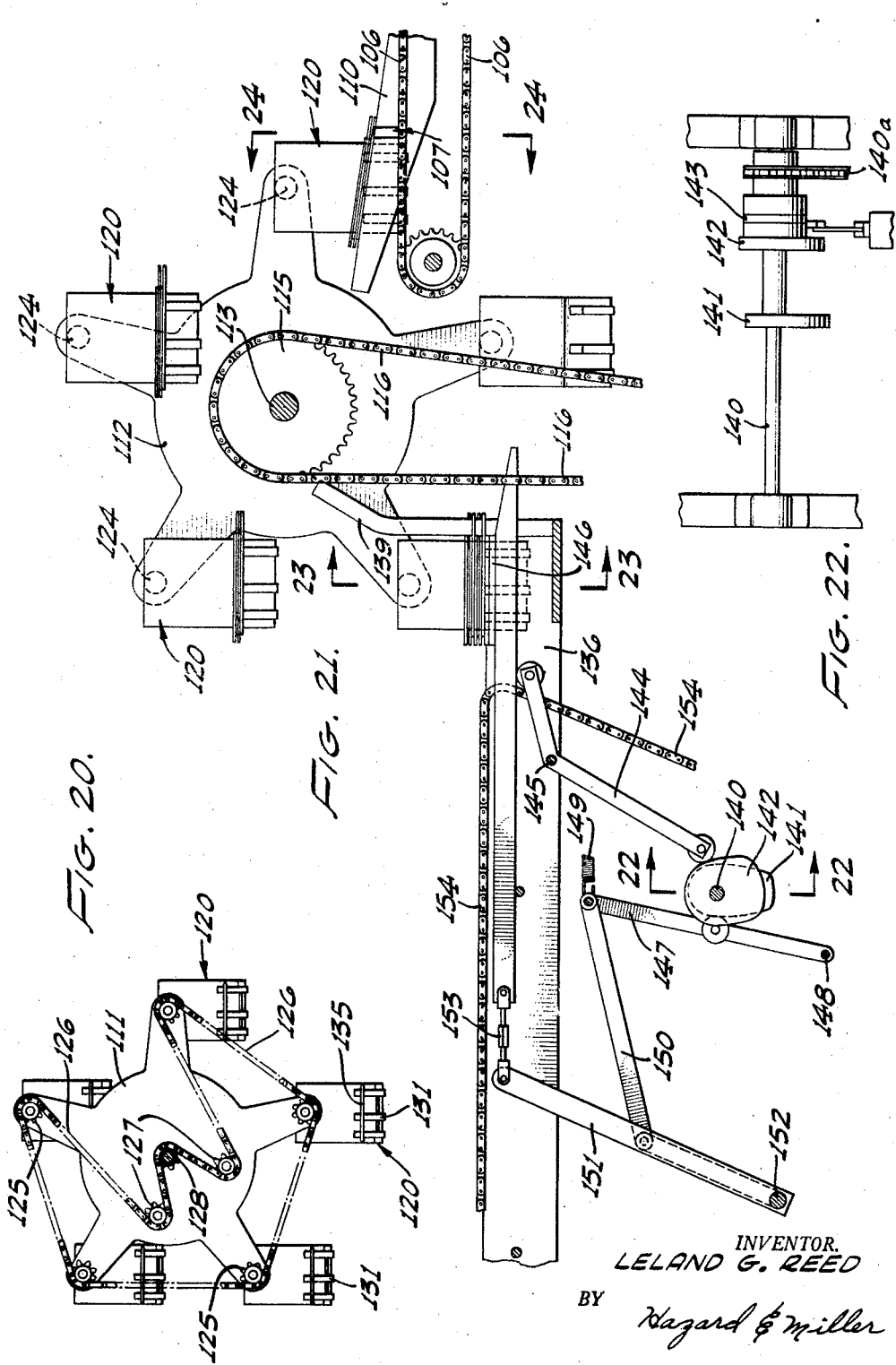

Aug. 4, 1959

L. G. REED 2,897,950

MACHINE FOR ASSEMBLING STORAGE BATTERY PLATES AND SEPARATORS

Filed Sept. 7, 1956

INVENTOR.
LELAND G. REED

BY Hazard & Miller

ATTORNEYS

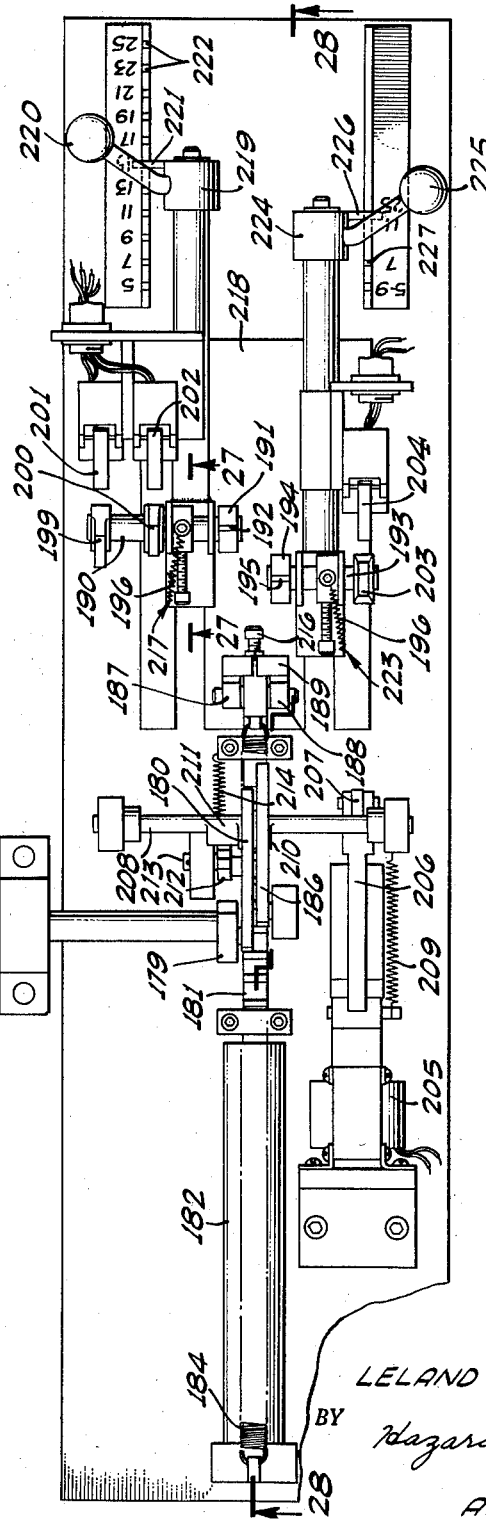
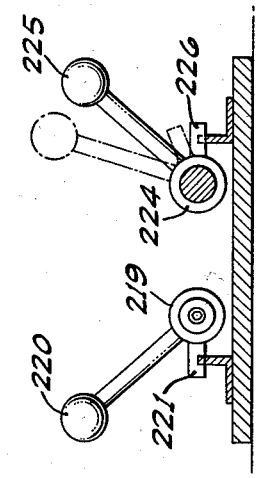
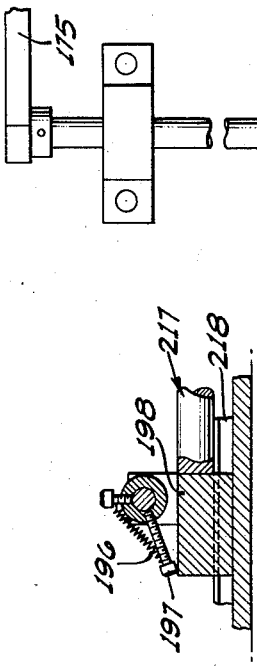

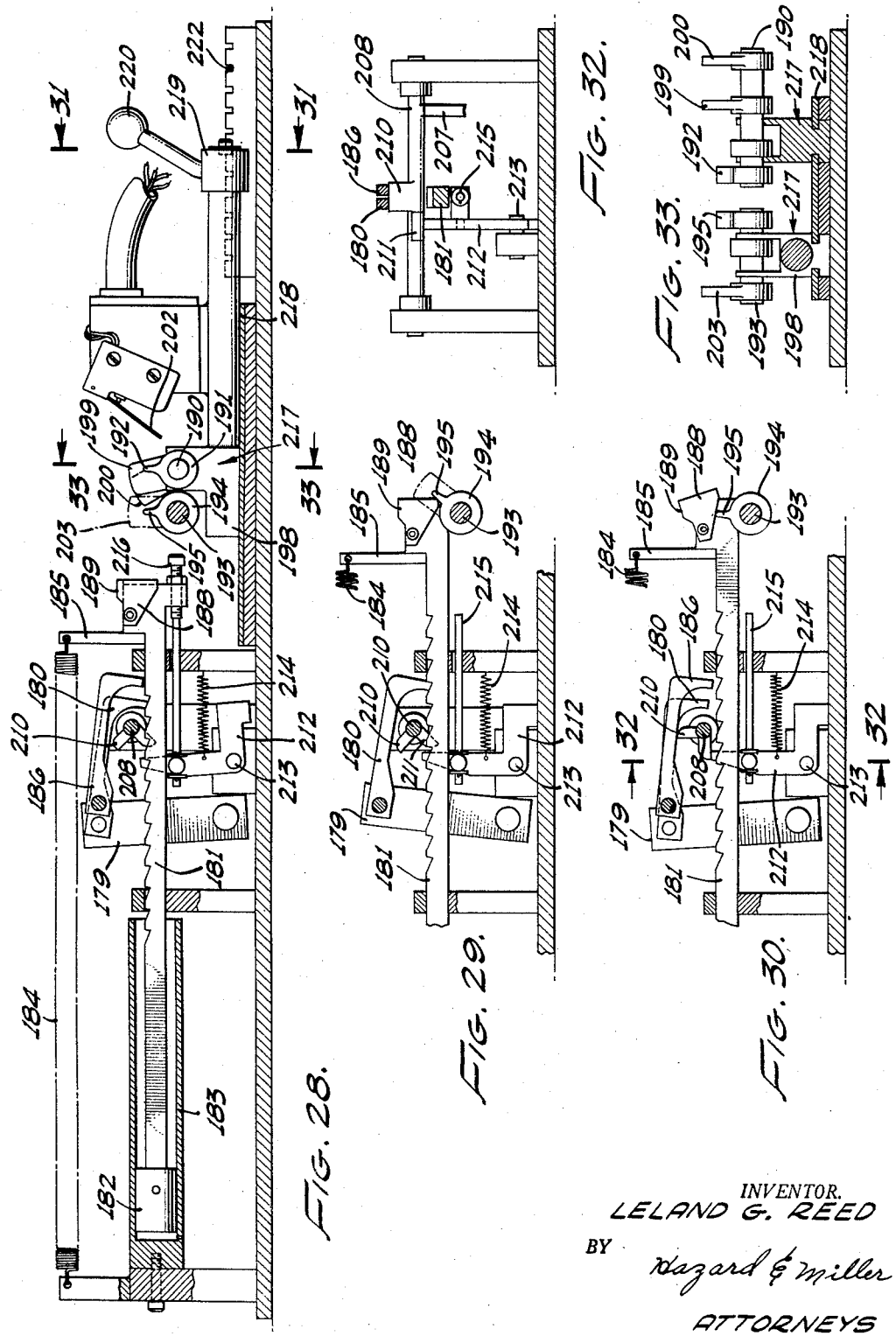

United States Patent Office 2,897,950
Patented Aug. 4, 1959

2,897,950

MACHINE FOR ASSEMBLING STORAGE BATTERY PLATES AND SEPARATORS

Leland G. Reed, Van Nuys, Calif., assignor to L. G. Reed Corporation, Van Nuys, Calif., a corporation of California Application September 7, 1956, Serial No. 608,615

3 Claims. (Cl. 198—35)

This invention relates to a machine for assembling storage battery plates and separators, and may be regarded as an improvement over the machine disclosed in my prior application Serial No. 411,764, filed February 23, 1954, now Patent No. 2,790,536.

In assembling the plates and separators for a storage battery conventional practice requires that positive plates be arranged between negative plates and spaced therefrom by separators. The end plates are negative plates so that the usual storage battery has an odd number of plates due to the fact that there is always one more negative plate than there are positive plates. The size or power of the battery usually dictates the number of plates in the battery, the number varying from as low as 5 plates to as high as 25 plates.

A primary object of the present invention is to provide an improved machine for assembling storage battery plates and separators which is adjustable to optionally deliver an assembled stack of plates and separators, which stack may contain 5, 7, 9, 11, or on up to 25 plates.

Another object of the invention is to provide a storage battery plate assembling machine wherein relatively small stacks of negative plates and relatively small stacks of positive plates can be positioned on the machine in the form of individual stacks. These stacks which may be regarded as feed stacks are progressively carried toward a stripper device which removes the lowermost plate of the feed stack and deposits it on a support in a position to be picked up by an endless conveyor. As one feed stack becomes exhausted by the consecutive removal of the lowermost plate therefrom by the stripper, succeeding feed stacks are advanced toward the stripper.

Another object of the invention is to provide a suitable mechanism for advancing the succeeding feed stacks of plates toward the stripper which will avoid sliding of the feed stacks toward the stripper. The sliding of positive or negative plates is to be avoided so that bricks of lead oxide mounted on the lead frame work of each plate will not be abraded away or loosened.

Another object of the invention is to provide an improved stripper mechanism which will remove the lowermost plate from a feed stack and which will simultaneously elevate the remaining plates of the feed stack. In this manner the weight of the remaining plates of the feed stack is lifted from the lowermost plate that is being removed therefrom by the stripper, avoiding abrasion of the lead oxide from the plate that is being stripped or slid from beneath the feed stack.

A further object of the invention is to provide a battery plate assembling machine having the above-mentioned characteristics wherein negative plates, after they have been stripped or removed from a feed stack, are deposited on a support in a position to be picked up by a conveyor, and wherein a separator is partially deposited on the negative plate in a position to be also picked up by the conveyor and caused to align itself with the negative plate. When the negative plate and the separator positioned thereon have been picked up by the conveyor they are carried to a second station in the machine, at which station a positive plate has been stripped from a positive feed stack and positioned on a support so as to be also picked up by the conveyor. A separator is also deposited in partially overlapping relation to the positive plate and when the positive plate and its separator are picked up by the conveyor this plate and its separator are caused to align themselves with the negative plate and its separator, thus forming a group. Each group consisting of one negative plate and one positive plate with separators disposed over each plate are normally carried through a third station and are delivered to a type of ferris wheel which lifts the group from the conveyor and deposits it on a mechanism which will transfer the plates and separators onto a delivery conveyor. At the third station above mentioned, an additional negative plate is deposited on a support in a position to be picked up by the conveyor so as to supply the odd or additional negative plate that is required in conventional battery construction. The depositing of the negative plate on the third station occurs only when a sufficient number of groups have been delivered to the ferris wheel to comply with the requirements of the size of battery that is to be produced. Thus, if the stack of plates and separators that is to be delivered to the delivery conveyor consists of only 5 plates a negative plate will be deposited on the support at the third station for every other group so that the delivered stack delivered to the delivery conveyor consists of three negative plates and two positive plates with separators disposed therebetween. On the other hand, if the finished stack delivered to the delivery conveyor is to consist of 9 plates, the negative plate deposited at the third station is deposited on only every fourth group so that the finished stack will consist of four positive plates and five negative plates with separators therebetween.

It is another object of the present invention to provide a timing mechanism that is variable and which will cause the negative plate to be deposited at the third station to meet the various requirements of different sizes of batteries running from 5-plate batteries up to as high as 25-plate batteries.

Another object of the invention is to provide a machine wherein groups of battery plates and separators are transferred from the initial conveyor to the ferris wheel and from the ferris wheel to the delivery conveyor which will avoid sliding of the group or stack of assembled plates and separators and thus avoid abrading or dislodging bricks of lead oxide from the plates.

Another object of the invention is to provide a machine wherein provision is made for continuously removing from the machine such particles of lead oxide as are loosened from the plates, thus avoiding its toxic effects upon workmen who may be operating the machine.

With the foregoing and other objects in view, which will be made manifest in the following detailed description and specifically pointed out in the appended claims, reference is had to the accompanying drawings for an illustrative embodiment of the invention, wherein:

Fig. 5 is a vertical section taken substantially upon the line 5—5 upon Fig. 1;

Fig. 6 is a partial view in vertical section taken substantially upon the line 6—6 upon Fig. 5 in the direction indicated;

Fig. 7 is a partial view in vertical section taken substantially upon the line 7—7 upon Fig. 5 in the direction indicated;

Fig. 8 is a partial view in vertical section taken upon the line 8—8 upon Fig. 7, the stripper being shown in a position wherein it has removed or stripped the lowermost plate of a feed stack;

Fig. 9 is a view similar to Fig. 8, but illustrating the stripper in a partially returned position from that shown in Fig. 8;

Fig. 10 is a sectional view taken on the line 8—8 upon Fig. 7, but illustrating the stripper in its rearmost position and just before it commences the stripping of a succeeding plate from a feed stack;

Fig. 11 is a partial view in horizontal section taken substantially upon the line 11—11 on Fig. 8;

Fig. 12 is a sectional view on an enlarged scale, taken substantially upon the line 12—12 upon Fig. 1 in the direction indicated;

Fig. 13 is a sectional view on an enlarged scale taken substantially upon the line 13—13 upon Fig. 1;

Fig. 14 is a horizontal section taken substantially upon the line 14—14 upon Fig. 13;

Fig. 15 is a partial view in vertical section taken substantially upon the line 15—15 upon Fig. 14 in the direction indicated, and illustrating a separator as having been positioned in partially overlapping relationship to a plate that has been stripped from a feed stack and deposited on the initial conveyor;

Fig. 16 is a view similar to Fig. 15, but illustrating the conveyor as having moved somewhat from right to left from the position shown in Fig. 15;

Fig. 17 is a view similar to Fig. 15, but illustrating the conveyor as having moved still a further distance from right to left from the position shown in Fig. 16;

Fig. 18 is a vertical section taken substantially upon the line 18—18 upon Fig. 13 in the direction indicated;

Fig. 19 is a view in side elevation of the delivery portion of the machine or of that portion of the machine which has been broken off of the left-hand end of Fig. 1;

Fig. 20 is a vertical section illustrating the mechanism employed for maintaining the carriers on the ferris wheel in horizontal position during rotation of the ferris wheel;

Fig. 21 is a partial view in vertical section illustrating the manner of operation of the ferris wheel and associated structure;

Fig. 22 is a vertical section taken substantially upon the line 22—22 upon Fig. 21 in the direction indicated;

Fig. 26 is a plan view of the timing mechanism which governs or regulates the deposit of the odd negative plate which completes a stack for final delivery and which causes a positioning of the completed stack on the delivery conveyor;

Fig. 27 is a partial view in vertical section taken substantially upon the line 27—27 upon Fig. 26;

Fig. 28 is a partial view in vertical section taken substantially upon the line 28—28 upon Fig. 26;

Fig. 29 is a partial view in vertical section of a portion of Fig. 28, but illustrating the parts in another position;

Fig. 30 is a view similar to Fig. 29, but illustrating the parts in still another position;

Fig. 31 is a vertical section taken substantially upon the line 31—31 on Fig. 28 in the direction indicated;

Fig. 32 is a vertical section taken substantially upon the line 32—32 upon Fig. 30 in the direction indicated;

Fig. 33 is a vertical section taken substantially upon the line 33—33 upon Fig. 28 in the direction indicated.

Figure 1:
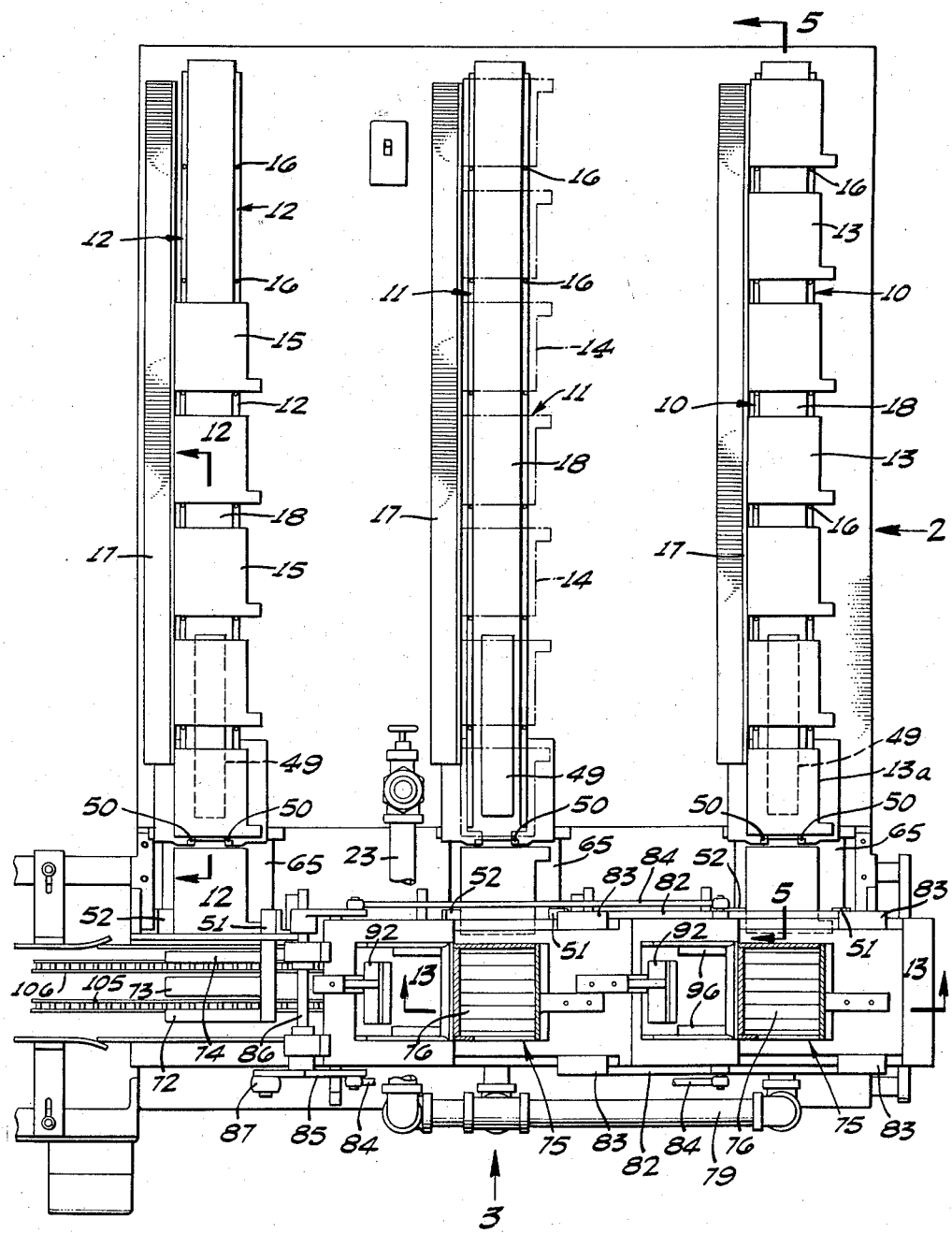
Figure 1 is a top plan view of the forward portion of the machine showing that portion of the machine wherein said stacks are being fed toward their respective stripper mechanisms, and plates therefrom, and separators therefor are being deposited at their respective stations to be picked up by the conveyor.

Referring to the accompanying drawings wherein similar reference characters designate similar parts throughout, the improved machine consists essentially of a feed mechanism on which short feed stacks of positive and negative plates are positioned which are carried to stripper devices which feed the plates consecutively from the feed stacks. The feed mechanism also includes racks or chutes in which separators are positioned which racks or chutes have strippers that feed the separators consecutively and in timed relationship to the deposited battery plates.

In addition to the feed mechanism there is what may be termed a gathering mechanism consisting principally of an endless conveyor having stops or pegs thereon that pick up or gather a negative plate and its separator and a positive plate and its separator, thus forming a group which is carried by the conveyor to the ferris wheel. The function of the ferris wheel is to receive consecutive groups and to deposit them in superposed relationship on a support to form a stack which, when completed, is transferred from a support to a delivery conveyor. As the completed stack has one more negative plate than there are positive plates, a negative plate is positioned on top of that group which is to form the uppermost group of a completed stack and adjustable timing mechanism is provided for depositing the final negative plate on top of that group that is to form the top of the completed stack and to cause the completed stack to be transferred to the delivery conveyor as soon as it is completed.

*Feed mechanism*

On a suitable support or frame there are pairs of stationary supporting rails, one pair being indicated by the reference character 10, a second pair by the reference character 11, and a third pair by the reference character 12.

The first pair of supporting rails serves to receive and support short feed stacks of negative battery plates, one of which stacks is indicated by the reference character 13. The second pair of supporting rails 11 is adapted to receive and support short feed stacks of positive plates 14. The third pair of rails 12 is adapted to have positioned thereon short feed stacks of negative plates one of which stacks is indicated at 15.

On the rails at spaced intervals there are upstanding bosses 16 which serve as indices for properly spacing the feed stacks along the lengths of the supporting rails. Adjacent each pair of supporting rails there are guide rails 17 against which the feed stacks can be pressed so as to properly position the feed stacks laterally with respect to the supporting rails 10, 11, and 12, respectively.

The feed mechanism for each row of feed stacks is the same, and consequently only one feed mechanism need be described.

Between the supporting rails 10 there is an advancing carrier 18 and similar advancing carriers are disposed between the rails 11 and between the rails 12. This advancing carrier is caused to undergo a gyratory movement to advance the stacks 13 toward a stop 19, see Fig. 5. This stop is arranged slightly above a supporting plate 20 which is perforated as indicated at 21, and which has a closed chamber 22 formed on its under side. This chamber has a conduit 23 connected thereto leading to a suction blower designed to suck off of the plates positioned above the supporting plate 20 any loose lead oxide. The carrier 18 has a vertically extending central web 24, see Fig. 6, that is disposed between a forward pair of crank arms 25 and a rear pair of crank arms 26, see Fig. 5. The forward pair of crank arms is swingably mounted on a rocker shaft 27 rotatably mounted in bearings 28 mounted on the frame. The rear pair of crank arms are mounted on a rocker shaft 29 that is rotatably mounted on bearings 30 on the frame. The crank arms of each pair are rigid with their respective rocker shafts and they are connected together by a link 31 so that they will be caused to move in unison about the axis of their rocker shafts 27 and 29, respectively. The upper ends of the crank arms 25 and 26 are equipped with rollers 32 that rollingly engage the under side of the carrier 18. The web 24 has an arm 33 rigidly secured thereto which extends downwardly therefrom. This arm is connected by a link 34 to a cam follower 35 having a roller 36 engageable with the periphery of a cam 37. When the cam 37 is rotated the cam follower 35 is oscillated about the shaft 38 as a center, and through the link 34 will impart back and forth or reciprocatory motion to the carrier 18.

The crank arms 25 have rigid therewith extensions 39 that are disposed below the rocker shaft 27 and which are connected by a link 40 to a cam follower 41 having a roller 42 that engages the periphery of a cam 43. The cam 43 is rigidly mounted on the shaft 44 on which the cam 37 is mounted so that both cams rotate in unison although the cams are oriented from each other. When the cam 43 rotates it oscillates the cam follower 41 and thus produces oscillations of the extensions 39 and of the crank arms 25 and 26. The rollers 32 on the upper ends of these crank arms are thus caused to swing or move through arcs, the centers of which are the axes of rocker shafts 27 and 29, respectively. Consequently, the effect of both cams 37 and 43 is to produce a type of gyratory motion of the carrier 18. That is, the initial movement is to swing the crank arms 25 and 26 causing the rollers 32 to roll forwardly on the under side of the carrier 18 and causing the carrier to be elevated. As the carrier rises it lifts all of the feed stacks 13 positioned on the supporting rails 10 above the supporting rails and above the tops of the index bosses 16. While in this elevated position, the cam 37 rotates to a position wherein a tension spring 45 that is connected to the end of the carrier 18 and to the frame can cause the carrier 18 to roll forwardly on the elevated rollers 32 until the forwardmost stack 13a is positioned against the stop 19. Continued rotation of the cam 43 causes the cam follower 41 to reversely oscillate and to thus reversely oscillate the crank arms 25 and 26, these crank arms being urged in this direction by a tension spring 46 connecting the rear pair of crank arms 26 to the frame. This has the effect of lowering the carrier 18 to a position wherein its top surface is below the top surfaces of the supporting rails 10, and while in this lowered position the cam 37 is effective to return the carrier to its initial position and in so doing, to stretch or tension the spring 45. The reverse oscillation of the crank arms 25 and 26 is limited by an arm 47 that is rigid with the rocker shaft 29 and which is engageable with the adjustable stop 48 on the frame.

In this manner, it will be appreciated that relatively small feed stacks 13 can be positioned in a row, one behind the other, on the supporting rails 10 and after having been centered thereon against the index bosses 16 and the guide rails 17, they may be progressively lifted by the carrier 18, advanced toward the stop 19, and then lowered into supporting engagement with the supporting rails 10. No sliding of the stacks 13 is required and consequently danger of abrading or of loosening the bricks of lead oxide on the plates is avoided.

The foremost stacks 13a is of course carried against the stop 19 and as the carrier 18 is lowered it is deposited on the supporting plate 20 immediately behind this stop after which the plate-like extension 49 on the forward end of the carrier is withdrawn from the deposited stack 13a while the carrier is in its lowermost position. It will be appreciated that as the carrier is advanced toward the stop 19 that its forward movement is occasioned by the tension spring 45 urging the carrier 18 forwardly and urging the cam follower 35 against the cam 37.

If, for any reason, there should be a jamming of the forwardmost stack 13a so that the carrier cannot carry it against the stop 19, the spring 45 merely stretches so that the machine will not damage itself. In this respect, the feed mechanism may be regarded as being so designed as to "fail safe."

Forwardly of the forward ends of the supporting rails 10 there are short vertical guides 50 which are adjustably mounted on the frame of the machine so that their spacing toward and away from the stop 19 can be adjusted to accommodate plates of different dimensions. On the rear side of the stop 19 there are inclined guides 51 and 52 that are adjustably mounted on the frame of the machine for adjustment toward and away from each other. These guides, together with the stop 19 and the guides 50, tend to center the forwardmost stack 13a as it is deposited on the supporting plate 20 by the extension 49 on the carrier 18. At the center of the stop 19 there is a vertical groove in which there is disposed a filler 53 having a finger 54 that extends downwardly. This filler is rigidly mounted on the rocker shaft 55 mounted on suitable bearings on the frame of the machine and carrying an arm 56 which actuates a switch 57.

The filler 53 is normally disposed in the recess in the rear face of the stop 19 but is urged therefrom into the position shown in Fig. 5. When the stack that is supported on the plate 20 becomes depleted so that the filler 53 is no longer held in the recess in the stop 19 but the finger can swing rearwardly over the uppermost plate of that portion of the stack remaining the switch 57 is closed. This switch is in circuit with the solenoid 58 of a single revolution clutch 59 that is on the cam shaft 44, see Fig. 4. This clutch is driven such as by a chain 60 off of a counter shaft 61 which, in turn, is driven by a chain 62 from a gear box 63 driven by an electric motor 64. Consequently, it will be appreciated that upon the depletion of a feed stack on the plate 20 the filler 53 is effective to cause the single revolution clutch to rotate the cams 37 and 43 one complete revolution, causing the carrier 18 to undergo one complete cycle of its gyratory movement as above explained, to deposit the next succeeding feed stack 13a on the plate 20 as soon as the preceding feed stack has become exhausted. This operation of the carrier 18, however, does not take place until the portion of the feed stack on the plate 20 nears exhaustion and as it is the exhaustion of this portion of the feed stack that is on the plate 20 which governs or controls the timing of the cycle of operation of the carrier 18, it will be appreciated that the feed stacks 13 on the carrier need not be of equal height. On the contrary, they may be of uneven height as is illustrated on Fig. 5. Nevertheless, when any feed stack on the plate 20 approaches exhaustion the cycle of operation of the carrier 18 is commenced and a succeeding feed stack 13a is then deposited to replace the feed stack that has become depleted.

As clearly illustrated in Fig. 8, the bottom of the stop 19 terminates a short distance above the top surface of the perforated supporting plate 20, the distance being slightly greater than the thickness of a battery plate. A stripper or shuttle 65 is reciprocable across the top surface of the plate 20. This stripper or shuttle has its forward edge approximately equal to the thickness of a battery plate. From this forward edge the stripper 65 tapers upwardly and rearwardly to the body of the stripper or shuttle which is slightly thicker than the thickness of a battery plate. The stripper or shuttle is reciprocated by a link 66 that is pivotally connected thereto and to a bellcrank 67 pivoted on the frame as at 68 and which is connected by a connecting rod 69 to a crank 70 that is rigidly mounted on the countershaft 61. Consequently, as the countershaft 61 is continuously rotated by means of the motor 64 and the gear box 63 the bellcrank 67 causes the stripper 65 to reciprocate. Each forward reciprocation causes the forward edge of the stripper to engage the trailing end of the bottom-most battery plate that is on the feed stack that is positioned against the stop 19 and to advance it beneath the stop. During this advancing movement of the lowermost plate the inclined upper surface of the stripper engages the under-surface of the plate next above, lifting the portion of the feed stack that remains over the supporting plate 20 a short distance. In this manner, the lowermost plate can be stripped from the stack and advanced by the stripper 65 beneath the stop 19 without having the entire weight of the feed stack supported on that plate which is being ejected. This not only reduces friction that might otherwise be imposed on the lowermost plate that is being ejected, but avoids abrasion between the ejected plate and the plate next above.

As the stripper 65 is retracted, as shown in Fig. 9, the remainder of the feed stack that is over the supporting plate 20 ultimately tips slightly and finally is dropped by the receding stripper onto the supporting plate 20. The stripper 65 retracts to a position shown in Fig. 10 where it is behind the guide 50 and from this position it advances to eject or strip off the lowermost plate of the feed stack which is then resting on the plate 20. During this stripping or ejecting procedure loose lead oxide that may be on the plates and which may have been loosened therefrom, is continually being sucked off through the perforations 21 and through the conduit 23 by the suction blower. The upper surface of the stripper 65 is preferably recessed as at 71 to accommodate portions of the stop 19 which extend into these recesses and which are spaced from supporting plate 20 a distance only slightly greater than the thickness of a battery plate.

Forwardly of the perforated plate 20 and at an elevation that is approximately horizontally even therewith, there are three stationary supports 72, 73, and 74 on which the plate that is ejected or stripped by the stripper 65 is positioned by the stripper. These supports which are opposite the ends of the supporting rails 10 may be regarded as the initial station of the gathering mechanism. Corresponding supports that are opposite the ends of the supporting rails 11 may be regarded as the second station of the gathering mechanism and corresponding supports opposite the supporting rails 12 may be regarded as the third station of the gathering mechanism.

Figure 3:
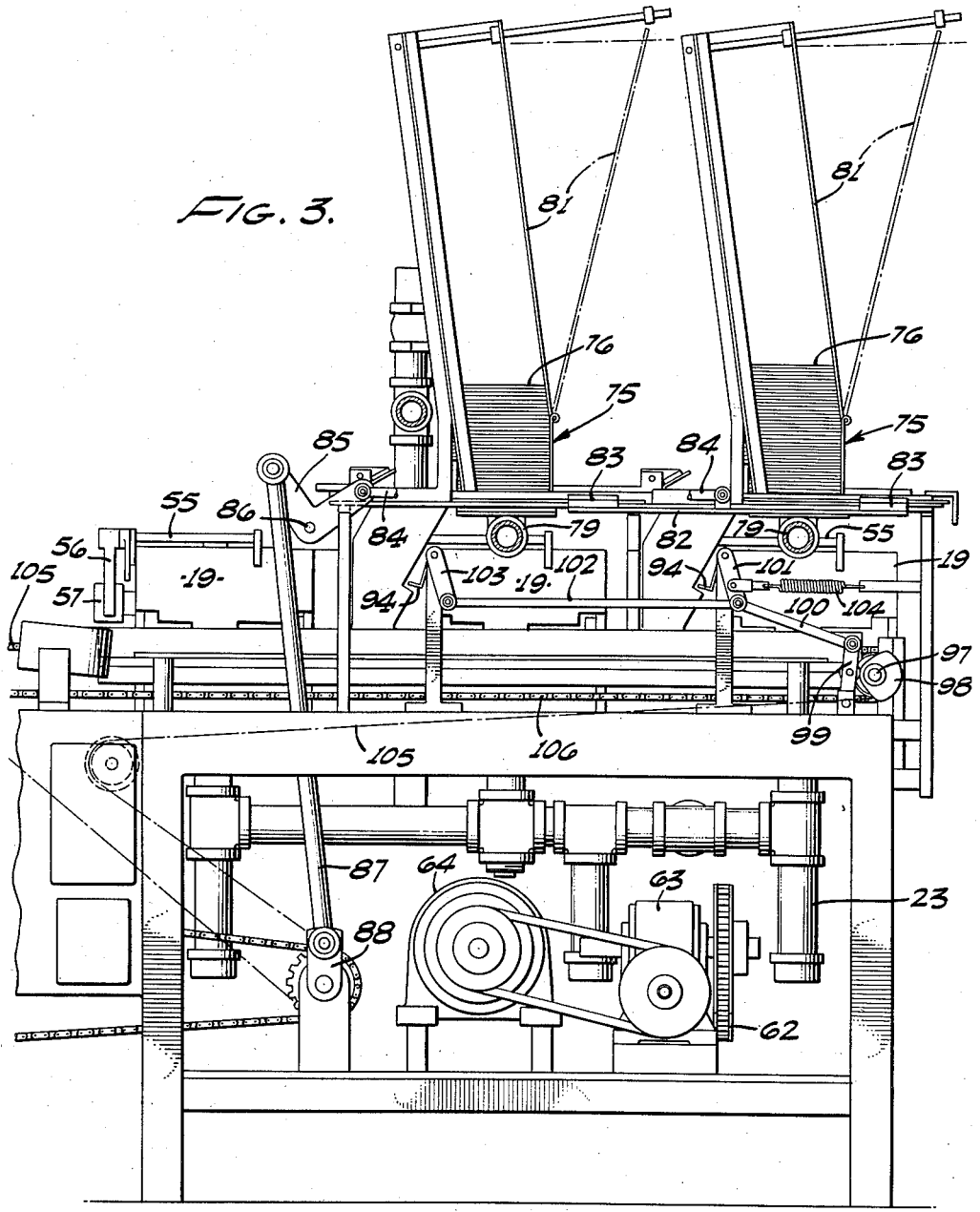
Fig. 3 is an end view of the machine taken in the direction of the arrow 3 upon Fig. 1.

Over the supports 72, 73, and 74 there is a rack or magazine generally indicated at 75 and a similar rack or magazine is disposed over the supports 72, 73, and 74 which are opposite the supporting rails 11. These racks or magazines are identical with each other and consequently only one need be described. They are each designed to hold a stack or supply of separators 76. The bottom of each rack or magazine is formed by a perforated plate 77, the under side of which is closed by a chamber 78 that is in communication with a conduit 79 that is connected to the same suction blower as that to which the conduit 23 is connected. The purpose of applying suction to the bottom of the stack of separators 76 is not only to withdraw lint, sawdust or other foreign matter from the separator, but also to cause the lowermost separator to be held firmly against the top surface of the perforated plate 77 prior to its being stripped from the stack by the reciprocable stripper 80. One wall of the rack or magazine is a hinged wall, as indicated at 81 on Fig. 3, so that this wall may be swung outwardly to facilitate placing separators 76 in the magazine following which the hinged wall is returned from the dotted line position shown on Fig. 3 to the full line position shown thereon.

The strippers 80 for both magazines 75 have their side edges connected to bars 82 which are slidably mounted on the side edges of the supporting plate 77 such as by channel blocks 83. The bars 82 are connected by connecting rods 84 to arms of bellcranks 85 which are rigidly mounted on rocker shafts 86 suitably journaled on the frame of the machine. The bellcranks 85 are oscillated by a connecting rod 87 that is connected to a crank 88 on shaft 89 that is driven continuously by miter gears 90 off of countershaft 61 from motor 64. Both strippers 80 are consequently caused to reciprocate in unison, and during each reciprocation, the lowermost separator 76 is ejected through the slot 91 in the wall of the magazine. As each separator that is ejected is passed through the slot 91 its forward edge encounters a downwardly extending, grooved guide 92 that directs the forward edge onto the shelf 93 of an escapement member 94 that is swingable on a rocker shaft 95 to and from a position slightly protruding forwardly of an inclined support 96, see Fig. 13.

When a separator 76 is ejected from the bottom of the separator stack its leading or advance edge consequently engages the guide 92 and is directed downwardly toward the ledge 93 on the escapement 94. The separator temporarily remains in this position, resting against the inclined support 96. The escapement 94 is located somewhat behind or in trailing relationship to the supports 72, 73, and 74, constituting the first station opposite the supporting rails 10. In a similar manner, the escapement 94 for the second magazine that is opposite the supporting rails 11 is disposed somewhat in trailing relationship to the corresponding supports that constitute the second station of the gathering mechanism.

On the frame of the machine there is a continuously rotated shaft 97 forming part of the gathering mechanism, and on this shaft there is a cam 98 engageable with a cam follower 99. The cam follower 99 is connected by a link 100 to a crank 101 which is rigid with the rocker shaft 95 of the first escapement 94. A link 102 connects this crank with the crank 103 for the second escapement causing both escapements to be actuated simultaneously. These escapements are urged into retracted positions with respect to the inclined support 96 or into the position shown in Fig. 3, by a tension spring 104 so that when the cam 98 is rotated into a position where the tension spring 104 can retract the escapements from the position shown in Fig. 13 to the position shown in Fig. 3, the separators that are temporarily resting on the ledges 93 are then allowed to drop. The shaft 97 is part of the conveyor of the gathering mechanism and consequently, the release of the separators takes place in timed relationship to the movement or operation of the gathering mechanism. When the separator is released by the escapement 94 it falls onto the conveyor in partially overlapping relationship to the plate that has been deposited on the supports 72, 73, and 74 of the station that immediately precedes it.

*Gathering mechanism*

Figure 2:
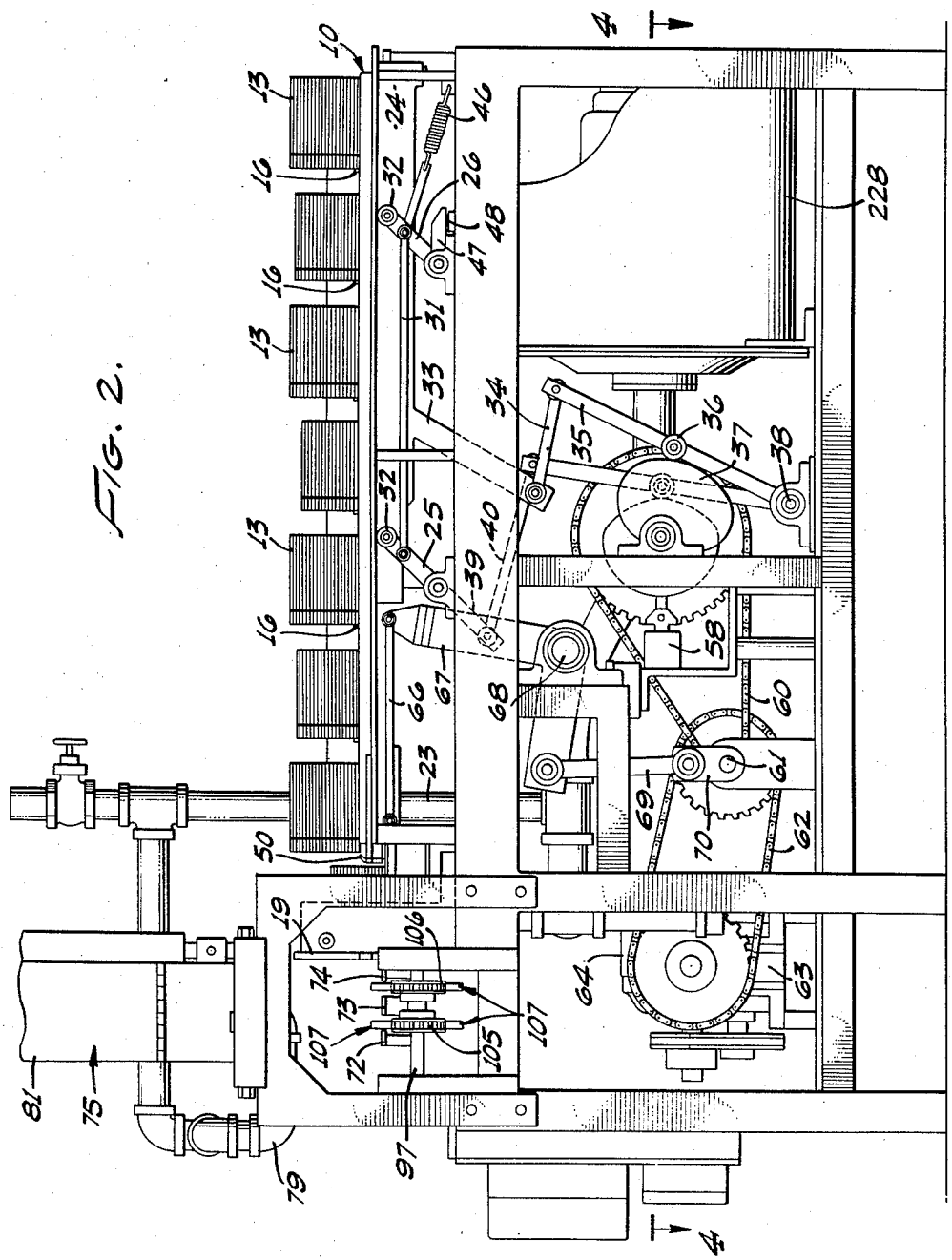
Fig. 2 is a view in side elevation of the machine taken in the direction of the arrow 2 upon Fig. 1.

The gathering mechanism consists of spaced parallel endless chains 105 and 106, see Fig. 2, which are trained over sprockets on the shaft 97. These endless chains have pickup pins 107 mounted thereon at suitably spaced intervals. The pickup pins on the chain 105 are movable between the supports 72 and 73 as shown on Fig. 2, and in a similar manner, the pickup pins on the chain 106 are movable between the supports 73 and 74. As the pickup pins pass between the supports they project upwardly thereabove. Consequently, at the first station which is opposite the supporting rails 10, the pickup pins 107 engage a negative plate that has been positioned on the supports 72, 73, and 74 by the stripper 65. The pickup pins cause the plate to slide from the supports 72, 73, and 74 and to rest wholly on those portions of the chains 105 and 106 which are immediately in advance of the pickup pins 107.

As will be observed from an inspection of Fig. 15, a separator 76 that has been released by the escapement 94 has been allowed to fall against the trailing sides of the pickup pins 107a and to come to rest in partially overlapping relationship to a battery plate 13b which has been picked up and removed from the supports 72, 73, and 74 by pickup pins 107b. The battery plate and separator are carried by the endless chains 105 and 106 beneath a guide 108 that extends beneath the supports 72, 73 and 74 that constitute the second station of the gathering mechanism. On the under side of this guide there is arranged a leaf spring 109, the end of which is curved downwardly as indicated at 110. This spring, together with its curved end, merely functions as a type of drag that engages the leading edge of the separator 76 that causes it to slide rearwardly over the plate 13b until the trailing edge of the separator 76 engages the pickup pins 107b. When the pickup pins 107b reach the supports 72, 73, and 74 of the second station and pass therebetween they engage the trailing edge of a positive plate that has been ejected by the stripper 65 from a feed stack of positive plates supported on the supporting rails 11. The separator that has been ejected from the second magazine will have been released by its escapement 94 and deposited on the endless chains 105 and 106 behind the pickup pins 107a in overlapping relationship to the positive plate. At the third station there is a leaf spring 109 which is effective as a drag on the second separator to cause the second separator to slide rearwardly over the top of the positive plate until it also engages the pickup pins 107b. In this manner, the chains 105 and 106, together with their pickup pins 107 and the springs 109, serve to gather into superposed relationship a negative plate from the first station, a separator deposited between the first and second station, a positive plate from the second station, and a separator deposited between the second and third stations. The two battery plates (positive and negative) together with the two separators may be regarded as constituting a group which is carried by the endless chains 105 and 106 onto spaced inclined ramps 110 at one side of a Ferris wheel, see Fig. 21.

The Ferris wheel comprises two spaced star wheels 111 and 112 rigidly mounted on a transversely extending shaft 113 so that they will be caused to rotate in unison. The ends of this shaft are rotatably mounted in bearings 114 on the frame of the machine. The star wheels are forcibly rotated by a sprocket 115 which is driven by a chain 116 off of a countershaft 117 which, in turn, is driven by chain 118 off of countershaft 89, see Fig. 19.

It might be mentioned at this point, endless chain 105 of the conveyor has a portion also extending around a sprocket on countershaft 89 and which is trained over idler sprocket 119. However, as the sprockets over which the conveyor chains 105 and 106 are trained are rigid with each other to cause the sprockets at the end of the upper reaches of the endless chain to rotate in unison, only the chain 105 need be driven by the countershaft 89. Chain 109 may merely extend between the sprockets at the ends of the gathering conveyor.

The star wheels 111 and 112 have radiating arms between which carriers, generally indicated at 120, are suspended. Each carrier consists of opposed angular plates, see Figs. 23 and 24, which plates of an individual carrier are indicated by the reference characters 121 and 122. These plates have trunnions 123 and 124 which rotatably extend through the outer ends of opposed radial arms of the star wheels 111 and 112. The trunnions are each equipped with sprockets 125, see Fig. 20, and in order to maintain the carriers in vertically suspended condition from their respective trunnions and to hold the carriers against swinging endless chains 126 are trained around the sprockets 125 and over idler sprockets 127 that are rotatably mounted on the outer sides of the star wheels 111 and 112.

On the shaft 113 that rotatably supports the star wheels there are mounted sprockets 128 and 129 over which the chains 126 are also trained. These sprockets are held against rotation by arms and pins which are rigid therewith and which are indicated at 130 that extend through stationary parts of the frame. Consequently, as the shaft 113 and the star wheels 111 and 112 rotate the chains 126 merely wrap upon and unwrap from the stationary sprockets 128 and 129, respectively, and as these sprockets are of the same diameters as the diameters of sprockets 125, it will be appreciated that sprockets 125 rotate with the same angular speed of rotation as the angular speed of rotation of the star wheels themselves. Consequently, the carriers 120 will always be maintained in vertical positions suspended from their respective trunnions and will be held against swinging movement regardless of the speed at which the star wheels may be rotated.

The lower ends of the opposed plates 121 and 122 are slotted to receive pawls 131 and 132, respectively. These pawls are rigidly mounted on rocker shafts 133 that are rotatably mounted on the outer sides of the plates 121 and 122, respectively. The pawls tend to fall inwardly by gravity and have their inward movements limited by stop pins 134 to positions wherein they project inwardly a short distance beyond the inner faces of the plates 121 and 122. Outward movement of the pawls is limited by guards or bails 135.

Figure 23:
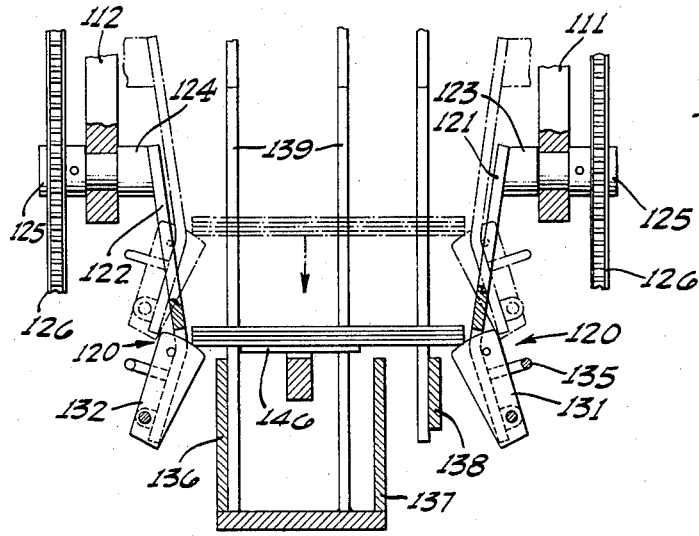
Fig. 23 is a vertical section taken upon the line 23—23 upon Fig. 21 in the direction indicated.
Figure 24:
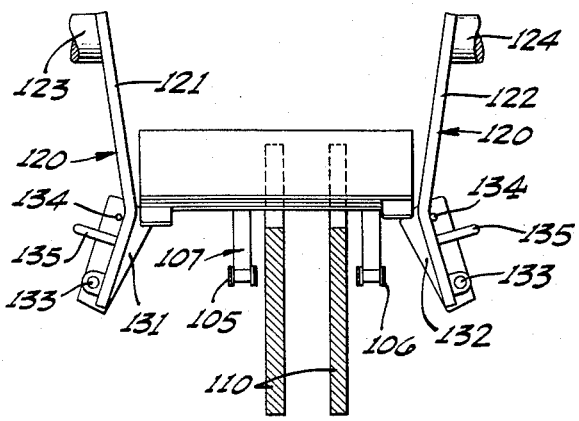
Fig. 24 is a vertical section taken substantially upon the line 24—24 upon Fig. 21 in the direction indicated.
Figure 34:
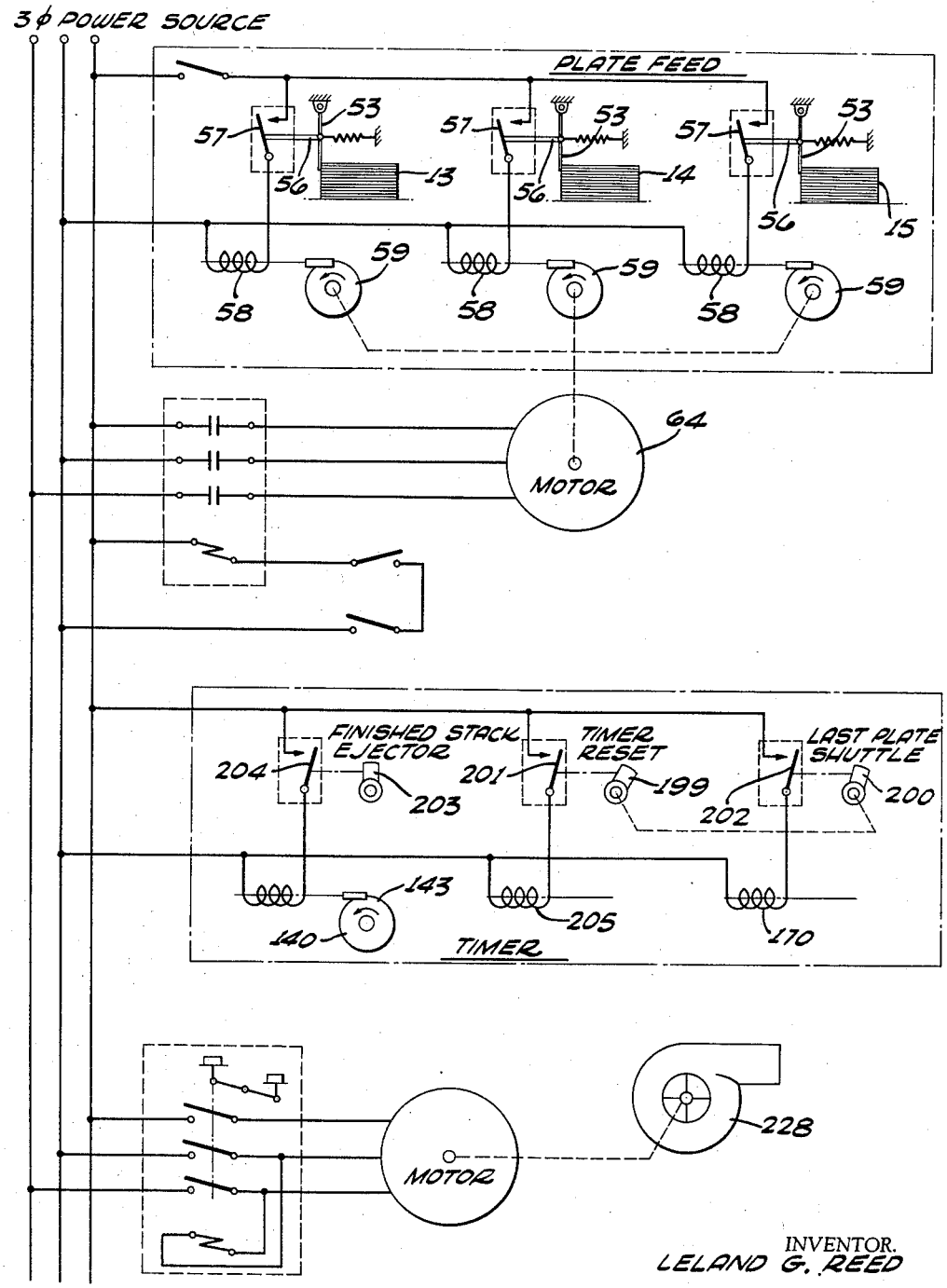
Fig. 34 is a wiring diagram of the electric circuits employed in the machine.

Comparing Figs. 21 and 24, it will be appreciated that the carrier shown in Fig. 24 is rising relatively to the inclined ramps 110 and that the pickup pins 107 on the gathering conveyor are about to pass beneath the group that has been caused to slide up the inclined ramps 110. The pawls 131 and 132 which are on the rising plates 121 and 122 project inwardly a sufficient distance to engage the bottom surface of the negative plate which is at the bottom of the group and to lift the group from the ramps 110. The group is then lifted by the carrier 120 and is carried across the top of the Ferris wheel provided by the star wheels 111 and 112. As the carrier descends on the opposite side of the Ferris wheel it encounters a landing support provided by spaced supporting rails 136, 137, and 138, see Fig. 23. At the ends of these supporting rails there are upstanding guides 139.

When the group that has been supported by the pawls 131 and 132 encounters the supporting rails 136, 137, and 138, the initial group has its downward movement merely arrested by the supporting rails and is consequently transferred from the carrier 120 thereto. The group that is on a succeeding carrier, illustrated in dotted lines on Fig. 23, is deposited on the initial group and in so doing, the initial group merely cams the pawls 131 and 132 outwardly through the slots in the plates 121 and 122 in which they are disposed. As these pawls are thus cammed outwardly they deposit the succeeding group on top of the initial group. The pawls after they pass the initial group, fall inwardly by gravity so as to be in position to pick up another group from the inclined rams 110. In this manner, a succession of groups can be deposited by the Ferris wheel in stacked relationship on top of the supporting rails 136, 137, and 138.

If the battery that is to be produced is merely a 5-plate battery, only two groups will be deposited on the supporting rails 136, 137, and 138 to form a stack which then is carried onto a delivery conveyor. On the other hand, if the battery that is to be produced is an 11-plate battery, five groups will be consecutively stacked, one on top of the other, on the supporting rails 136, 137 and 138 before the stack is transferred to the delivery conveyor. Similarly, if the battery that is to be produced is a 25-plate battery, twelve groups will be consecutively stacked, one on top of the other on the supporting rails 136, 137, and 138 before the stack is transported to the delivery conveyor.

The means for transferring a completed stack from the supporting rails 136, 137, and 138 to the delivery conveyor consists of a shaft 140, see Figs. 19, 21, and 22. This shaft is driven by chain 140a off of shaft 117. On the shaft 140 there are two cams 141 and 142 and an electrically operated single revolution clutch 143. Cam 142 has a bellcrank cam follower 144 pivoted on the frame at 145 and carrying a roller which supportingly engages the under side of a carrier 146 that is disposed between the supporting rails 136, 137, see Fig. 23. The other cam 141 has a cam follower 147 pivoted on the frame at 148 which is urged against the cam by a tension spring 149. This cam follower is connected by a link 150 to an arm 151 that is pivoted to the frame at 152 and which is connected by a link 153 to the carrier 146.

When the solenoid of the single revolution clutch 143 is energized shaft 139 makes a single revolution and the effect of the cams is to cause the cam follower 144 to lift the carrier 146, thus lifting the stack from the supporting rails 136, 137, and 138. When the stack has thus been lifted, cam follower 147 causes the carrier 146 to move from right to left as viewed in Fig. 21, thus positioning the stack over a delivery conveyor formed by endless chains 154. These chains are also driven off of shaft 117 by means of a chain 155 which drives a shaft 156. 157 is merely a spring-actuated chain tightener for tightening chain 155.

The delivery conveyor formed by the chains 154 is thus continuously driven off of shaft 117 and when the stack of plates has been carried by the carrier 146 into a position over the chains 154, the carrier 146 is lowered by the cam 142 and cam follower 144, thus depositing the stack on the delivery conveyor. The cam 141 then allows the carrier to return to its initial position between the rails 136 and 137 preparatory to transferring a succeeding stack from the supporting rails onto the delivery conveyor. From the delivery conveyor formed by chains 154 the completed stacks may be manually removed for purposes of "burning" the assembled plates together for installation in a battery case.

*Depositing odd negative plates*

As previously explained, conventional practice requires that there be one more negative plate in the stack of plates than there are positive plates. Consequently, it is necessary to deposit on top of the last group that completes a stack an additional negative plate. Thus, if a 5-plate battery is to be produced the stack is composed of two groups and on the second of these groups an additional negative plate is deposited. On the other hand, if the battery that is to be produced is an 11-plate battery, an additional negative plate is deposited only on the top of every fifth group that is delivered to the Ferris wheel. Similarly, if a 25-plate battery is to be produced the additional or odd negative plate is deposited on top of every twelfth group delivered to the Ferris wheel.

The stripper or ejector 65 that is at the forward end of the supporting rails 12 that support feed stacks of negative plates is actuated in timed relation to the machine to deposit this odd negative plate on the supports 72, 73, and 74 opposite the supporting rails 12 or at the third station of the gathering mechanism only when the last group to complete a stack has reached this station.

Referring now to Fig. 12 which illustrates the mechanism that reciprocates the stripper or ejector 65a for the feed stacks of odd or additional negative plates, the connecting rod 69a is connected to the countershaft 61 in the same manner as the connecting rods 69 are connected thereto, and consequently imparts to the bellcrank 67a the same oscillatory movement as that which is imparted to the bellcranks 67. Bellcrank 67a, however, is not directly connected to the stripper or ejector 65a as in the case of the links 66. In lieu thereof, the stripper or ejector 65a is connected to reciprocatory bars 158 which are mounted for reciprocatory movement on rollers 159. The bars 158 are equipped with upstanding fingers 160 engageable by rollers 161 which are on the bellcranks 67a. When the bellcranks 67a are rotated in a clockwise direction, as viewed in Fig. 12, they are effective to move the bars 158 rearwardly against bumpers 162 at which position the stripper or ejector 65a is fully retracted as illustrated in Fig. 12. Each bar is equipped with a single ratchet tooth 163 engageable by pawls 164 that are pivoted at 165 on the upper ends of the bellcranks 67a. The pawls 164 have pins 166 extending laterally therefrom which extend over the top edges of release bars 167. The release bars are rigidly connected together by a rocker shaft 168 which is rotatably mounted on the frame of the machine and which is urged into its uppermost position by a compression spring 169. 170 indicates a solenoid, the core of which is connected by a link 171 to the release bar 167.

During normal operation of the machine, when groups are being formed of a negative plate obtained from the row of said stacks supported on the supporting rails 10 and a positive plate received from said stacks supported on the supporting rails 11, the movement of the bellcranks 67a and of the pawls 164 is merely an idle movement. During this idle movement the pawls 164 are held out of engagement with their respective ratchet teeth 163 by the laterally extending pins 166 merely sliding upon the top edges of the release bars 167. However, when the additional or odd negative is to be deposited on the third station of the gathering mechanism on top of the last group that is to form a completed stack, the solenoid 170 is energized, causing the link 171 to draw the release bars 167 downwardly against the action of the compression springs 169. This allows the pawls 164 to fall so that they may engage the ratchet teeth 163 the next time that the bellcrank 67a is moved in a counterclockwise direction. Consequently, with this engagement established between the bellcranks 67a and the bars 158, the bars will be moved forwardly by the bellcranks 67a and the ejector 65a will eject or strip off a negative plate and position it on the supports 72, 73, and 74 at the third station to be picked up or gathered by the pickup pins 107 that are behind the last group required to complete a stack. When the bellcranks 67a are swung in a counterclockwise direction the engagement between rollers 161 and the fingers 160 causes the bars 158 to be retracted and to thus retract the stripper or ejector 65a. The deenergizing of the solenoid 170 allows the compression spring 169 to become effective to raise the release bars 167 and thus lift the pawls 164 by their pins 166 into a disengaging position as illustrated in Fig. 12. Thereafter, oscillation of the bellcranks 67a merely causes the pawls and their pins 166 to slide back and forth on the release bars 167 until such time as the solenoid 170 is again energized.

*Adjustable timing mechanism*

Figure 4:
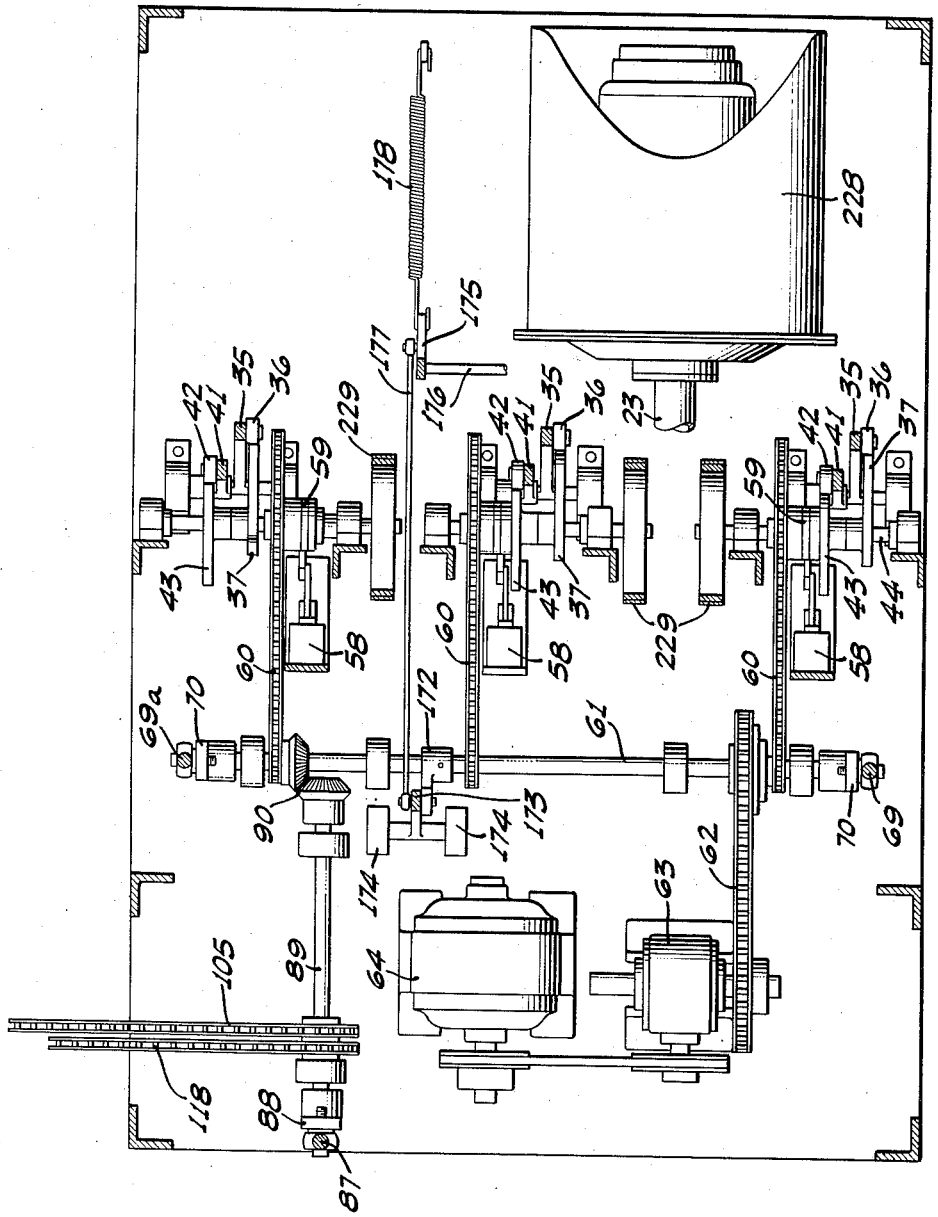
Fig. 4 is a horizontal section taken upon the line 4—4 upon Fig. 2.

On the countershaft 61 there is mounted a cam 172, see Fig. 4, which engages the roller of a cam follower 173 that is rotatably mounted in bearings 174 that in turn are mounted on the base of the machine. The cam follower 173 which is caused to oscillate by the cam 172 is connected to the crank arm 175 of a rocker shaft 176 by connecting rod 177. A tension spring 178 is also connected to this crank arm and urges the rocker shaft into a predetermined position as well as urges the cam follower 173 into engagement with the cam 172. The rocker shaft is consequently caused to rock back and forth once for each revolution of the countershaft 61. Each revolution of the countershaft 61 is effective to strip or eject one negative plate and one positive plate and two separators onto the gathering conveyor. Consequently, each revolution of the countershaft 61 may be regarded as bringing about a complete normal cycle of the machine towards producing one group of one negative plate, one positive plate, and two separators.

On the rocker shaft 176 there is a crank 179 which has pivotally mounted thereon an advancing pawl 180 which falls by gravity into engagement with a ratchet rack 181. The forward end of this ratchet rack has a piston 182 reciprocable in a cylinder 183 in which there is a small bleed hole. This piston and cylinder constitute a dashpot which cushions the return or forward movement of the rack 181 when it is released for forward movement and can be returned by the tension spring 184. The tension spring is stretched between a stationary structure on the cylinder 183 and an arm 185 at the rear end of the rack. An anti-backup pawl 186 is pivotally mounted on a stationary support and is disposed adjacent the advancing pawl 180 so as to also be engageable with the teeth on the ratchet rack.

For each revolution of the countershaft 61 the crank 179 will be oscillated and cause the advancing pawl 180 to advance the rack 181 the distance of one tooth. The rack is held in the advanced position by the anti-backup pawl 186. On the rear end of the rack two dogs 187 and 188 are pivotally mounted for pivotal movement relatively to the rack independently of each other. These dogs have their movements in a clockwise direction as viewed in Fig. 28, limited by finger portions 189 which engage the top of the rack. However, they may be swung from the position shown in Fig. 28 to the position shown in Fig. 30.

A rocker shaft 190 has a collar 191 thereon equipped with a finger 192 arranged in the path of dog 187. In a similar manner, a rocker shaft 193 has a collar 194 equipped with a finger 195 arranged in the path of dog 189. As viewed in Fig. 26, finger 195 is closer to dog 188 than finger 192 is to dog 187. Consequently, as the rack is advanced by the advancing pawl 180 dog 188 will engage finger 195 and rotate or rock rocker shaft 193 first. As advancement of the ratchet rack continues, dog 187 will ultimately engage finger 192 and rotate or rock rocker shaft 190. The rocker shafts 190 and 193 are urged into positions wherein the fingers 192 and 195 extend vertically upward by tension springs 196. Rotation of the rocker shafts under the influence of these tension springs is limited by radial screws 197 which are engageable with the top surfaces of supporting blocks 198 disposed therebeneath, see Fig. 27.

On the rocker shaft 190 there are two cams 199 and 200 which, when the rocker shaft 190 is rotated by dog 187 are caused to engage fingers 201 and 202, respectively of switches. The cams 199 and 200 are so oriented on the rocker shaft 190 that the switch of finger 201 will be closed in advance of the switch of finger 202. In a similar manner, rocker shaft 193 is equipped with a cam 203 engageable with the finger 204 of an electric switch when this cam is rotated by dog 188. Switch having finger 204 is electrically connected to the solenoid that actuates the single revolution clutch 143 which, when energized, causes the carrier 146 to transfer a completed stack of plates from the supporting rails 136, 137, and 138 onto the delivery conveyor 154 so that each time that the switch for finger 204 is closed a completed stack will be deposited on the delivery conveyor 154. The switch for finger 201 is electrically connected to solenoid 170 which brings about a lowering of the release bars 167 so that the odd or additional negative plate supplied on supporting rails 12 will be deposited on the supports 72, 73, and 74 of the third station. Consequently, each time that the switch for finger 201 is closed the odd or additional negative plate will be supplied to the gathering mechanism.

The switch for finger 202 is electrically connected to solenoid 205 whose armature is connected by a link 206 to crank 207 on a rocker shaft 208. Rotation of the rocker shaft 208 effects a disengagement of the pawls 180 and 186 from the ratchet rack 181 to allow the ratchet rack to be returned by tension spring 184. After the armature of solenoid of 205 is actuated its armature and the rocker shaft 208 are returned to a normal position by a tension spring 209.

On the rocker shaft 208 there are two cam lobes 210 and 211 that are oriented from each other approximately 90° as illustrated in Figs. 28, 29, and 30. The lobe 210 is disposed beneath both pawls 180 and 186 so that when the rocker shaft 208 is rocked by solenoid 205 whose circuit is closed by the switch of finger 202, both pawls will be lifted from engagement with the ratchet rack 181 to free the ratchet rack for return movement as illustrated in Fig. 30.

The other cam lobe 211 that is on the rocker shaft 208 is engageable with a pivoted latch 212 that is pivoted at 213 and which is urged in a clockwise direction as viewed in Figs. 28, 29, and 30 by a tension spring 214. This latch carries a rearwardly extending finger 215 adapted to be engaged by an adjustable stop 216, see Fig. 28, that is on the rear end of the ratchet rack.

The rocker shaft 190 and the switches having fingers 201 and 202 are all mounted on a slide 217 that is slidable on a base 218 mounted on the frame of the machine. On the forward end of this slide there is a handled collar 219 having a handle 220 that enables the collar to be rotated to position a finger 221 selectively in any one of a number of notches 222 in an upstanding flange mounted on the frame of the machine. In a similar manner, rocker shaft 193 and the switch for finger 204 are mounted on a slide 223 on which there is a rotatable collar 224 having a handle 225 by which it can be rotated to position the finger 226 selectively in any one of notches 227 in an upstanding flange. Thus, by rotating handle 220 to disengage finger 221 from a notch 222 the position of rocker shaft 190 can be varied with respect to the travel of the ratchet rack 181. When adjusted to the desired position on rotating the handle 220 the slide and consequently the position of rocker shaft 190 may be fixed. In a similar manner, the position of rocker shaft 193, along with the travel of the ratchet rack 181 can be adjusted and fixed.

The operation of the above-described timing apparatus is substantially as follows:

For each revolution of the countershaft 61 and a consequent discharge of positive and negative plates onto the gathering mechanism rocker shaft 176 will rock back and forth once. Each rocking cycle of rocker shaft 176 brings about an advancement of the ratchet rack 181 a distance of one tooth.

If the number of plates in a completed stack is relatively small, such as five plates, then the rocker shaft 190 and consequently finger 192 are positioned relatively close to dog 187 on the rear end of the ratchet rack. The same is true of the position of rocker shaft 193 and finger 195. As the rack 181 is advanced with a step-by-step movement by rocker shaft 176, dog 188 will engage finger 195 and rotate cam 203 into engagement with finger 204 whose switch causes the solenoid of single revolution clutch 143 to be energized and cause carrier 146 to transfer a completed stack onto the delivery conveyor 154. Similarly, dog 187 will engage finger 192 and rotate cams 199 and 200 into engagement with fingers 201 and 202, respectively. The engagement with finger 202 takes place in advance of finger 201 and when finger 202 is engaged its switch energizes solenoid 170 and causes an ejectment of the odd or last negative plate onto the third station of the gathering mechanism. The rack 181 continues to be advanced so that finally finger 201 will be engaged by cam 199 and the closing of its switch energizes solenoid 205 which rotates rocker shaft 208. This causes cam lobe 210 to lift both pawls 180 and 186 out of engagement with the rack or into the position shown in Fig. 30. In the course of rotating rocker shaft 208 from the position shown in Fig. 29 to the position shown in Fig. 30, cam lobe 211 cams the top of latch 212 forwardly a sufficient distance for cam lobe 211 to pass thereby. As soon as cam lobe 211 passes by the latch the latch is returned to the position shown in Fig. 30 by the tension spring 214, thus latching rocker shaft 208 in its rotated position despite the fact that tension spring 209 is urging the rocker shaft 208 and the armature of solenoid 205 to return.

When the pawls 180 and 186 are disengaged from the ratchet rack 181 the tension spring 184 immediately returns the ratchet rack to the position shown in Fig. 28. Its return movement is cushioned by the air entrapped in the cylinder 183 behind piston 182 which escapes slowly through the bleed hole. When the ratchet rack has just about completed its return movement the adjustable stop 216 on the rear end of the ratchet rack engages finger 215 rotating the latch 212 from the position shown in Fig. 30 to the position shown in Fig. 28, thus releasing cam lobe 211 and allowing spring 209 to be effective to return the rocker shaft 208 into the position shown in Fig. 28. This causes cam lobe 210 to again lower or re-deposit the pawls 180 and 186 on the ratchet rack. When these are re-deposited, oscillations of shaft 176 will bring about a step-by-step advancement of the ratchet rack and the cycle of operation is repeated.

Figure 25:
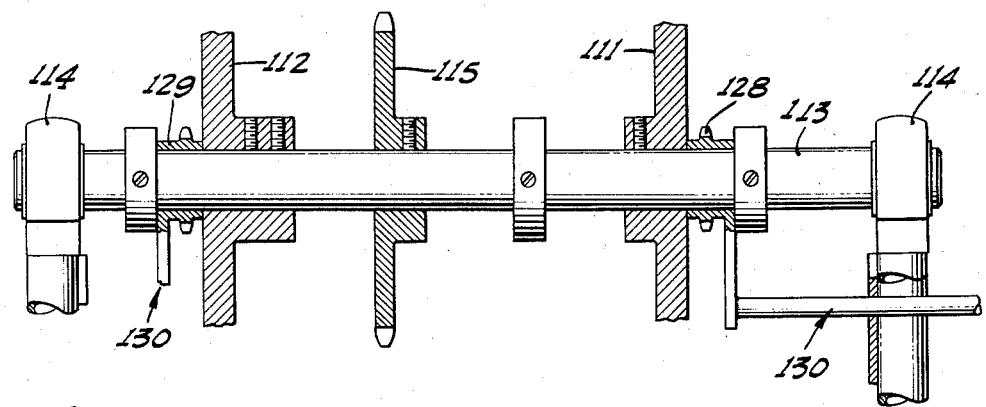
Fig. 25 is a sectional view taken substantially upon the line 25—25 upon Fig. 19 in the direction indicated.

It will be appreciated that if rocker shaft 190 is adjusted to a position more remote from the ratchet rack that the ratchet rack 181 will have to be advanced more steps before dog 187 engages finger 192 to cause finger 202 to be engaged and cause a discharge of the last or odd negative plate. Consequently, the notches 222 may be equally spaced from each other, the spacing being equal to the spacing of the ratchet teeth on the ratchet rack. Thus in the position shown on Fig. 25, finger 192 is at the position for a 15-plate battery and is spaced the lengths of five ratchet teeth from the position it would assume if finger 221 were in notch 222 opposite the numeral 5. This means that ratchet rack 181 would have to advance the distance of five teeth farther to engage finger 192 to make a 15-plate battery than in the case where a 5-plate stack is being produced. As each oscillation of shaft 176 occurs when plates for one group are discharged, five of such groups, in addition to the two groups required for a 5-plate battery would have to be in the process of formation on the gathering mechanism before switch for contact 202 was engaged to cause the discharge of the additional or odd negative plate at the third station of the gathering mechanism.

Mere adjustment of the position of rocker shaft 190 therefore determines the number of groups that will have to have been gathered by the gathering mechanism before the odd or negative plate is discharged on the last group.

The spacing of the notches 227 that are selectively engaged by the finger 226 is somewhat different. As indicated on the drawing, when finger 226 is in the first notch labelled 5—9, the position of rocker shaft 193 and of finger 195 is for producing either 5 or 9-plate batteries. The position of the second notch labelled 7 governs the position of finger 195 when a 7-plate battery is being produced. The position of the third notch is the position assumed in producing stacks of 11, 13, 15, 17, 19, 21, 23 and 25 plates. It will be recalled that finger 204 is for the switch which governs the transfer of the completed stacks onto the delivery conveyor 154. In effect, there are six stations between the supports 72, 73, and 74 for the deposit of the last or odd negative plate and the supporting rails 136, 137, and 138. These stations are: (1) the third station of the gather apparatus where the odd negative plate is deposited; (2) the inclined ramps 110; (3), (4), (5) the positions of the three carriers on the Ferris wheel in the process of transit from the inclined ramps to the supporting rails 136, 137, and 138; and (6) the position on the supporting rails 136, 137, and 138.

In the production of a 5-plate stack there will be an additional or odd negative plate on every other group that is in transit between the third station of the gathering mechanism and the rails 136, 137, and 138. Consequently, finger 195 will be engaged by dog 188 to actuate carrier 146 every other cycle of the machine. Consequently, when finger 226 is in the foremost notch 227 finger 195 is in a position to be engaged by dog 188 every second advancement of ratchet rack 181. Where 7-plate stacks are being produced finger 226 is in notch 227 labelled "7" and this positions finger 195 so that it will only be engaged by dog 188 every third normal cycle of the machine to cause carrier 146 to transfer a completed stack after three groups have been deposited on rails 136, 137, and 138 by the Ferris wheel.

Where a 9-plate stack is being produced finger 226 is returned to notch 227 that is utilized to produce a 5-plate stack. This would apparently indicate that finger 195 was engaged by dog 188 only after two groups had been deposited by the carriers 120 on the supporting rails 136, 137, and 138. This is true at the initial start of the machine. However, it is to be observed that after the dog 188 has engaged finger 195 and rocked rocker shaft 193 that finger 192 is in a more rearward position when finger 221 is in notch 222 opposite the reference character 9. Consequently, after conveyor 146 has been actuated by finger 195, rack 181 continues to be advanced a distance two teeth or two complete cycles until finger 192 is engaged, with the result that between consecutive operations of carrier 146 there will be four cycles of the machine at the conclusion of which switch for finger 202 will be engaged to discharge an odd negative plate and finger 201 will also be engaged to effect a return of the ratchet rack 181. Consequently, between consecutive engagements of finger 195 there will be four complete cycles or the formation of four groups of plates at the conclusion of the last of which the odd or additional negative plate will be deposited on the last group. It so happens with this arrangement that the third notch 227 that can be occupied by the finger 226 can be used for all stacks of plates 11 to 25, inclusive, inasmuch as stacks of eleven or more plates involve the assembling together on the supporting rails 136, 137, and 138 all of the groups in transit between the third station of the gathering mechanism and the supporting rails 136, 137, and 138, or additional groups to those which are in transit.

228 indicates the suction blower to which the tubes adjacent the perforated supports 20 and beneath the separator magazines are connected. This blower discharges at a point remote from the machine. 229 merely indicates friction brakes which prevent overrunning of shaft in which the single revolution clutches are incorporated.

From the above-described construction it will be appreciated that an improved battery plate assembling machine has been provided having numerous advantages. Positive and negative plates can be positioned in the form of relatively small feed stacks on the supporting rails 10, 11, and 12. These are automatically advanced toward the stop 19 as the stack against the stop 19 becomes depleted. The plates are ejected or stripped from these feed stacks onto the gathering conveyor, one positive plate and one negative plate and separators for each group. After the plates and separators have been gathered into groups an additional or odd negative plate is deposited automatically on the last group required to complete a stack. The groups are transported from the ramps 110 by the Ferris wheel onto the supporting rails 136, 137, and 138, and when a stack is completed, it is automatically transferred from these supporting rails onto the delivery conveyor 154. From the delivery conveyor the completed stacks may be manually removed.

Various changes may be made in the details of construction without departing from the spirit and scope of the invention as defined by the appended claims.

I claim:

1. In a battery plate assembling machine, the combination of a gathering conveyor, a support arranged over the conveyor, means for depositing a battery plate on the support, means for depositing a separator in partial overlapping relation to the battery plate, pickup pins on the conveyor arranged to engage the plate as the conveyor moves and move the plate from a support beneath the separator and onto the conveyor, and means for retarding movement of the separator in the direction of movement of the conveyor until the separator is engaged by the pickup pins.

2. In a battery plate assembling machine, the combination of a gathering conveyor, a support arranged over the conveyor, means for depositing a negative plate on the support, means for depositing a separator in partial overlapping relation to the negative plate, pickup pins on the conveyor arranged to engage the negative plate as the conveyor moves and move the plate from the support beneath the separator and onto the conveyor, means for retarding movement of the separator until it is engaged by the pickup pins, a second support over the conveyor, means for depositing a positive plate on the second support, means for depositing a second separator on the positive plate in partial overlapping relation thereto, said positive plate and separator being also engageable by the pickup pins to be moved thereby from the second support onto the conveyor in superposed relation to the negative plate and the first-mentioned separator.

3. In a battery plate assembling machine, the combination of a gathering conveyor, a support arranged over the conveyor, means for depositing a negative plate on the support, means for depositing a separator in partial overlapping relation to the negative plate, pickup pins on the conveyor arranged to engage the negative plate as the conveyor moves and move the plate from the support beneath the separator and onto the conveyor, means for retarding movement of the separator until it is engaged by the pickup pins, a second support over the conveyor, means for depositing a positive plate on the second support, means for depositing a second separator on the positive plate in partial overlapping relation thereto, said positive plate and separator being also engageable by the pickup pins to be moved thereby from the second support onto the conveyor in superposed relation to the negative plate and the first-mentioned separator, a third support arranged over the conveyor, and means for depositing a negative plate on the third support at intervals to be picked up by the pickup pins and moved thereby into a position overlying the negative plate and positive plate and their separators.

References Cited in the file of this patent
UNITED STATES PATENTS

| | | |
|---|---|---|
| 1,246,566 | Doering | Nov. 13, 1917 |
| 1,716,349 | Wallace | June 4, 1929 |
| 2,176,761 | Fisher | Oct. 17, 1939 |
| 2,362,134 | Honig | Nov. 7, 1944 |
| 2,546,597 | Harris | Mar. 27, 1951 |
| 2,565,779 | Muddiman | Aug. 28, 1951 |
| 2,606,669 | Morrison | Aug. 12, 1952 |
| 2,626,038 | Smith | Jan. 20, 1953 |
| 2,652,933 | Willard | Sept. 22, 1953 |
| 2,661,103 | Fay | Dec. 1, 1953 |
| 2,680,510 | Donath | June 8, 1954 |
| 2,704,593 | Galloway | Mar. 22, 1955 |
| 2,761,361 | Hornberger | Sept. 4, 1956 |
| 2,790,536 | Reed | Apr. 30, 1957 |
| 2,807,227 | Kerns | Sept. 24, 1957 |
| 2,830,692 | Winkel | Apr. 15, 1958 |